US012579204B1

(12) United States Patent
Zakharov et al.

(10) Patent No.: US 12,579,204 B1
(45) Date of Patent: Mar. 17, 2026

(54) AUTOMATIC EVALUATION OF STICKER RECOMMENDATIONS

(71) Applicant: Snap Inc., Santa Monica, CA (US)

(72) Inventors: Aleksandr Zakharov, Dubai (AE); Hanna Rulevska, Almere (NL); Sergey Smetanin, London (GB)

(73) Assignee: SNAP INC., Santa Monica, CA (US)

( * ) Notice: Subject to any disclaimer, the term of this patent is extended or adjusted under 35 U.S.C. 154(b) by 1 day.

(21) Appl. No.: 18/740,912

(22) Filed: Jun. 12, 2024

Related U.S. Application Data

(60) Provisional application No. 63/472,684, filed on Jun. 13, 2023.

(51) Int. Cl.
*G06F 16/9535* (2019.01)
*G06F 16/2457* (2019.01)
(Continued)

(52) U.S. Cl.
CPC .... *G06F 16/9535* (2019.01); *G06F 16/24578* (2019.01); *G06F 16/9538* (2019.01); *G06N 5/022* (2013.01)

(58) Field of Classification Search
CPC ........... G06F 16/9535; G06F 16/24578; G06F 16/9538
See application file for complete search history.

(56) References Cited

U.S. PATENT DOCUMENTS 5,604,843 A   2/1997 Shaw et al.
5,689,559 A   11/1997 Park
(Continued)

FOREIGN PATENT DOCUMENTS

CN     109863532     6/2019
CN     110168478     8/2019
(Continued)

OTHER PUBLICATIONS

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.
(Continued)

*Primary Examiner* — Truong V Vo
(74) *Attorney, Agent, or Firm* — SCHWEGMAN LUNDBERG & WOESSNER, P.A.

(57)   ABSTRACT

Examples described herein relate to systems and methods for automatic evaluation of graphical element recommendations, such as sticker recommendations. According to some examples, a system accesses a set of text queries and provides each text query as input to a graphical element recommendation machine learning model. The graphical element recommendation machine learning model is trained to generate, based on a given text query, one or more graphical element recommendations for use in a message in a context of a messaging interface of an interaction application. The system obtains, from the graphical element recommendation machine learning model, at least one graphical element recommendation for each text query. The system generates a model quality score for the graphical element recommendation machine learning model by applying a model quality metric to the graphical element recommendations. Output indicative of the model quality score may be presented at a user device.

20 Claims, 14 Drawing Sheets

(51) Int. Cl.
    *G06F 16/9538* (2019.01)
    *G06N 5/022* (2023.01)

(56) References Cited

U.S. PATENT DOCUMENTS

| | | | |
|---|---|---|---|
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres Del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 8,990,672 B1 * | 3/2015 | Grosz .................. G06F 40/186 |
| | | 715/202 |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,659,405 B1 | 5/2020 | Chang et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,502,983 B2 | 11/2022 | Heikkinen et al. |
| 12,149,489 B2 | 11/2024 | Golobokov et al. |
| 2002/0067362 A1 | 6/2002 | Agostino Nocera et al. |

(56)　　　　References Cited

U.S. PATENT DOCUMENTS

| | | |
|---|---|---|
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0125811 A1 | 5/2010 | Moore et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0046423 A1 | 2/2015 | Weeks |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0039406 A1 | 2/2018 | Kong et al. |
| 2018/0047200 A1 | 2/2018 | O'hara et al. |
| 2018/0083898 A1 | 3/2018 | Pham |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2019/0286648 A1 | 9/2019 | Wan et al. |
| 2020/0259948 A1 | 8/2020 | Keohane et al. |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0383251 A1 | 12/2021 | Osborn et al. |
| 2021/0385179 A1 | 12/2021 | Heikkinen et al. |
| 2021/0385180 A1 | 12/2021 | Al Majid et al. |
| 2021/0397645 A1 | 12/2021 | Wang et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0269354 A1 | 8/2022 | Prasad et al. |
| 2022/0269733 A1 | 8/2022 | Li et al. |
| 2022/0337540 A1 | 10/2022 | Bayer et al. |
| 2024/0314091 A1 | 9/2024 | Golobokov et al. |
| 2024/0419295 A1 | 12/2024 | Smetanin et al. |
| 2024/0422113 A1 | 12/2024 | Smetanin et al. |
| 2025/0055818 A1 | 2/2025 | Golobokov et al. |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

OTHER PUBLICATIONS

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

"Instant Comics Starring You and Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"U.S. Appl. No. 18/183,794, Non Final Office Action mailed Sep. 19, 2023", 12 pgs.

(56)                 References Cited

OTHER PUBLICATIONS

"U.S. Appl. No. 18/209,130, Non Final Office Action mailed Oct. 19, 2023", 12 pgs.

"U.S. Appl. No. 18/183,794, Response filed Nov. 3, 2023 to Non Final Office Action mailed Sep. 19, 2023", 12 pgs.

"U.S. Appl. No. 18/183,794, Final Office Action mailed Jan. 8, 2024", 13 pgs.

"U.S. Appl. No. 18/209,130, Response filed Jan. 17, 2024 to Non Final Office Action mailed Oct. 19, 2023", 11 pgs.

"U.S. Appl. No. 18/183,794, Response filed Jan. 30, 2024 to Final Office Action mailed Jan. 8, 2024", 14 pgs.

"U.S. Appl. No. 18/209,130, Final Office Action mailed Feb. 20, 2024", 15 pgs.

"U.S. Appl. No. 18/183,794, Non Final Office Action mailed Mar. 12, 2024", 14 pgs.

"U.S. Appl. No. 18/209,130, Response filed Apr. 22, 2024 to Final Office Action mailed Feb. 20, 2024", 11 pgs.

"U.S. Appl. No. 18/183,794, Response filed May 6, 2024 to Non Final Office Action mailed Mar. 12, 2024", 12 pgs.

"U.S. Appl. No. 18/183,794, Final Office Action mailed May 31, 2024", 7 pgs.

"U.S. Appl. No. 18/183,794, Response filed Jun. 13, 2024 to Final Office Action mailed May 31, 2024", 11 pgs.

"U.S. Appl. No. 18/209,130, Advisory Action mailed Jun. 14, 2024", 3 pgs.

"U.S. Appl. No. 18/209,130, Response filed Jun. 14, 2024 to Advisory Action mailed Jun. 14, 2024", 11 pgs.

"U.S. Appl. No. 18/209,144, Non Final Office Action mailed Jun. 17, 2024", 17 pgs.

"U.S. Appl. No. 18/183,794, Notice of Allowance mailed Jul. 11, 2024", 7 pgs.

"U.S. Appl. No. 18/209,144, Response filed Sep. 17, 2024 to Non Final Office Action mailed Jun. 17, 2024", 10 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Kuhn, Steve, "How to Send Stickers on Snapchat?", ITGeared, [Online]. Retrieved from the Internet: <URL: https://www.itgeared.com/how-to-send-stickers-on-snapchat/>, (Aug. 31, 2022), 6 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmoji-customizable- geofilters-2448152>, (Nov. 18, 2016), 6 pgs.

"U.S. Appl. No. 18/209,130, Advisory Action mailed May 28, 2025", 3 pgs.

"U.S. Appl. No. 18/209,130, Examiner Interview Summary mailed Feb. 4, 2025", 2 pgs.

"U.S. Appl. No. 18/209,130, Final Office Action mailed Mar. 18, 2025", 14 pgs.

"U.S. Appl. No. 18/209,130, Non Final Office Action mailed Nov. 15, 2024", 14 pgs.

"U.S. Appl. No. 18/209,130, Response filed Feb. 14, 2025 to Non Final Office Action mailed Nov. 15, 2024", 11 pgs.

"U.S. Appl. No. 18/209,130, Response filed May 15, 2025 to Final Office Action mailed Mar. 18, 2025", 12 pgs.

"U.S. Appl. No. 18/209,144, Examiner Interview Summary mailed Jan. 31, 2025", 2 pgs.

"U.S. Appl. No. 18/209,144, Examiner Interview Summary mailed May 14, 2025", 2 pgs.

"U.S. Appl. No. 18/209,144, Final Office Action mailed Dec. 12, 2024", 17 pgs.

"U.S. Appl. No. 18/209,144, Non Final Office Action mailed Feb. 28, 2025", 17 pgs.

"U.S. Appl. No. 18/209,144, Response filed Feb. 7, 2025 to Final Office Action mailed Dec. 12, 2024", 11 pgs.

"U.S. Appl. No. 18/209,144, Response filed May 27, 2025 to Non Final Office Action mailed Feb. 28, 2025", 9 pgs.

* cited by examiner 104          124                                    100

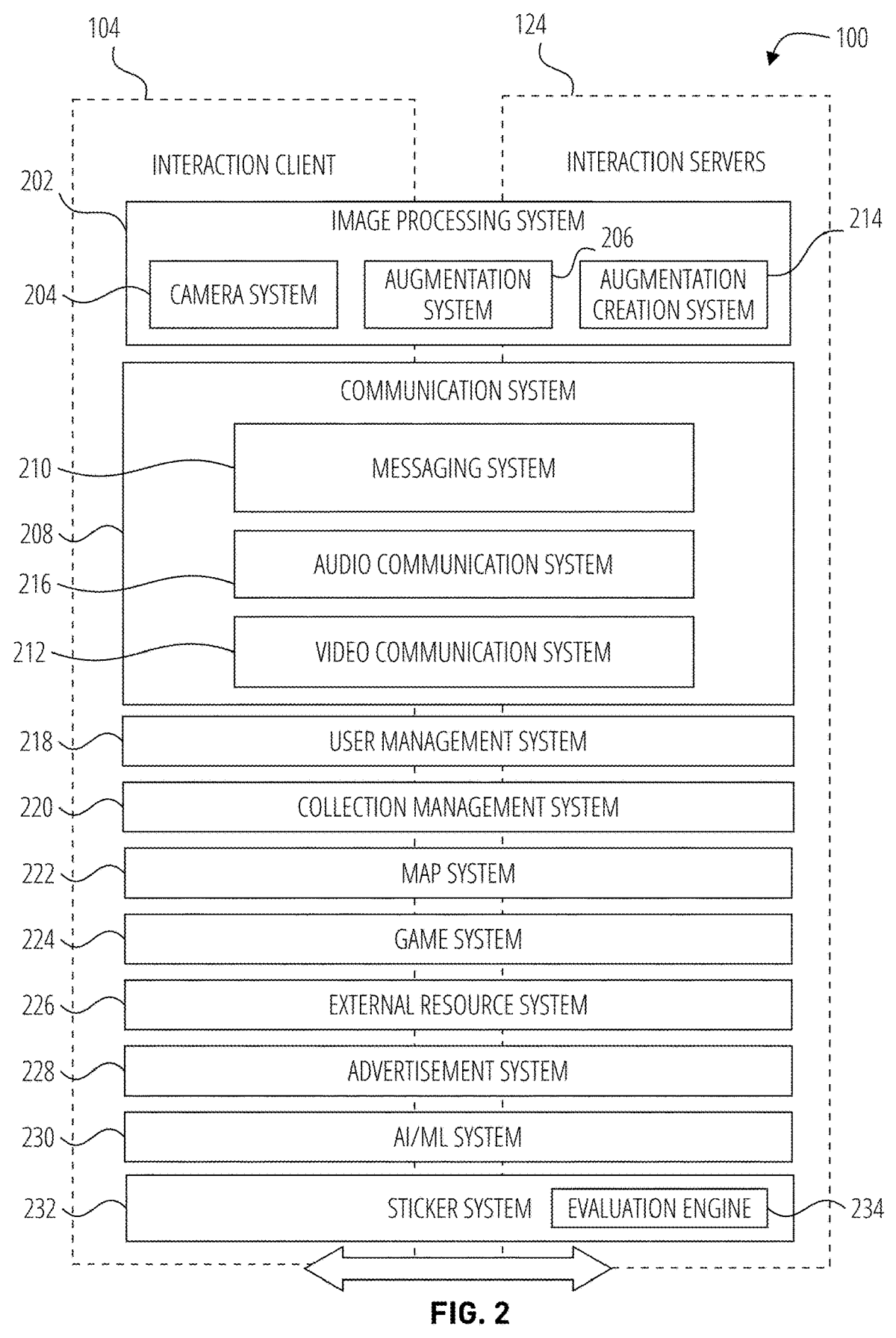

INTERACTION CLIENT          INTERACTION SERVERS

202 — IMAGE PROCESSING SYSTEM
206
214

204 — CAMERA SYSTEM     AUGMENTATION SYSTEM     AUGMENTATION CREATION SYSTEM

COMMUNICATION SYSTEM

210 — MESSAGING SYSTEM 208
216 — AUDIO COMMUNICATION SYSTEM

212 — VIDEO COMMUNICATION SYSTEM

218 — USER MANAGEMENT SYSTEM

220 — COLLECTION MANAGEMENT SYSTEM

222 — MAP SYSTEM

224 — GAME SYSTEM

226 — EXTERNAL RESOURCE SYSTEM

228 — ADVERTISEMENT SYSTEM

230 — AI/ML SYSTEM

232 — STICKER SYSTEM     EVALUATION ENGINE — 234

FIG. 2

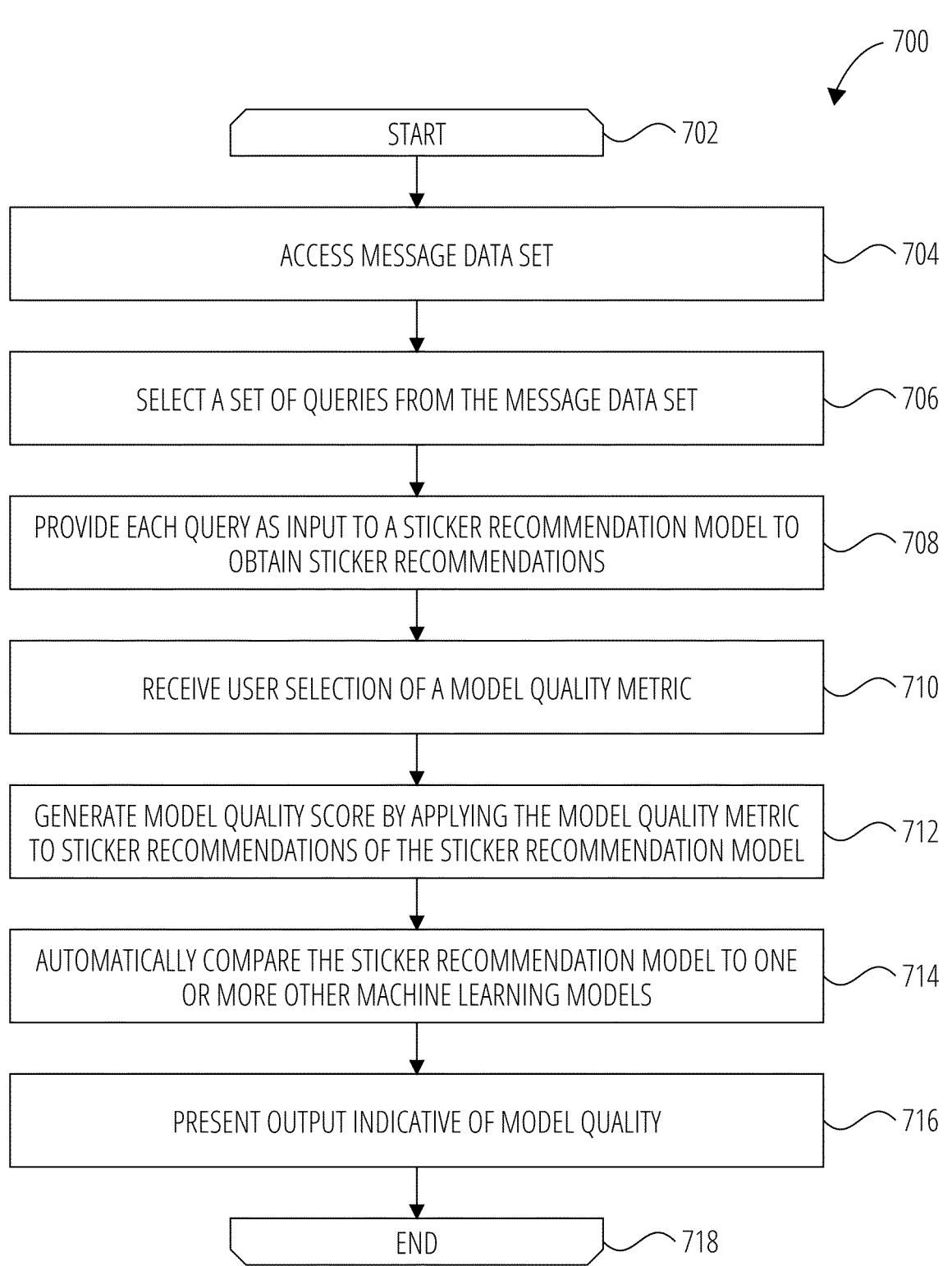

700

START — 702

ACCESS MESSAGE DATA SET — 704

SELECT A SET OF QUERIES FROM THE MESSAGE DATA SET — 706

PROVIDE EACH QUERY AS INPUT TO A STICKER RECOMMENDATION MODEL TO OBTAIN STICKER RECOMMENDATIONS — 708

RECEIVE USER SELECTION OF A MODEL QUALITY METRIC — 710

GENERATE MODEL QUALITY SCORE BY APPLYING THE MODEL QUALITY METRIC TO STICKER RECOMMENDATIONS OF THE STICKER RECOMMENDATION MODEL — 712

AUTOMATICALLY COMPARE THE STICKER RECOMMENDATION MODEL TO ONE OR MORE OTHER MACHINE LEARNING MODELS — 714

PRESENT OUTPUT INDICATIVE OF MODEL QUALITY — 716

END — 718

FIG. 7

AUTOMATIC EVALUATION OF STICKER RECOMMENDATIONS

CLAIM OF PRIORITY

This application claims the benefit of priority to U.S. Patent Application Ser. No. 63/472,684, filed on Jun. 13, 2023, which is incorporated herein by reference in its entirety.

TECHNICAL FIELD

The present disclosure relates to systems and methods for automatic evaluation of graphical element recommendations, such as sticker recommendations.

BACKGROUND

Advances in a variety of computer-related technologies have given rise to several online or Internet-based interaction applications that provide messaging functionality. Traditional messaging systems and applications, such as e-mail or conventional text messaging, are quickly being replaced or supplemented with new messaging applications that provide for generating and communicating with rich content—including content that incorporates a variety of different media formats, such as text, audio, graphics, images, animations, photographs, video, augmentations, and/or digital effects. One media format that has become increasingly popular is the digital sticker, more frequently referred to simply as a sticker.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 2 is a diagrammatic representation of an interaction system, according to some examples, that has both client-side and server-side functionality.

FIG. 7 is a flowchart illustrating a method suitable for evaluation of a graphical element recommendation model, such as a sticker recommendation model that may be used in an interaction system, according to some examples.

DETAILED DESCRIPTION

Figure 1:
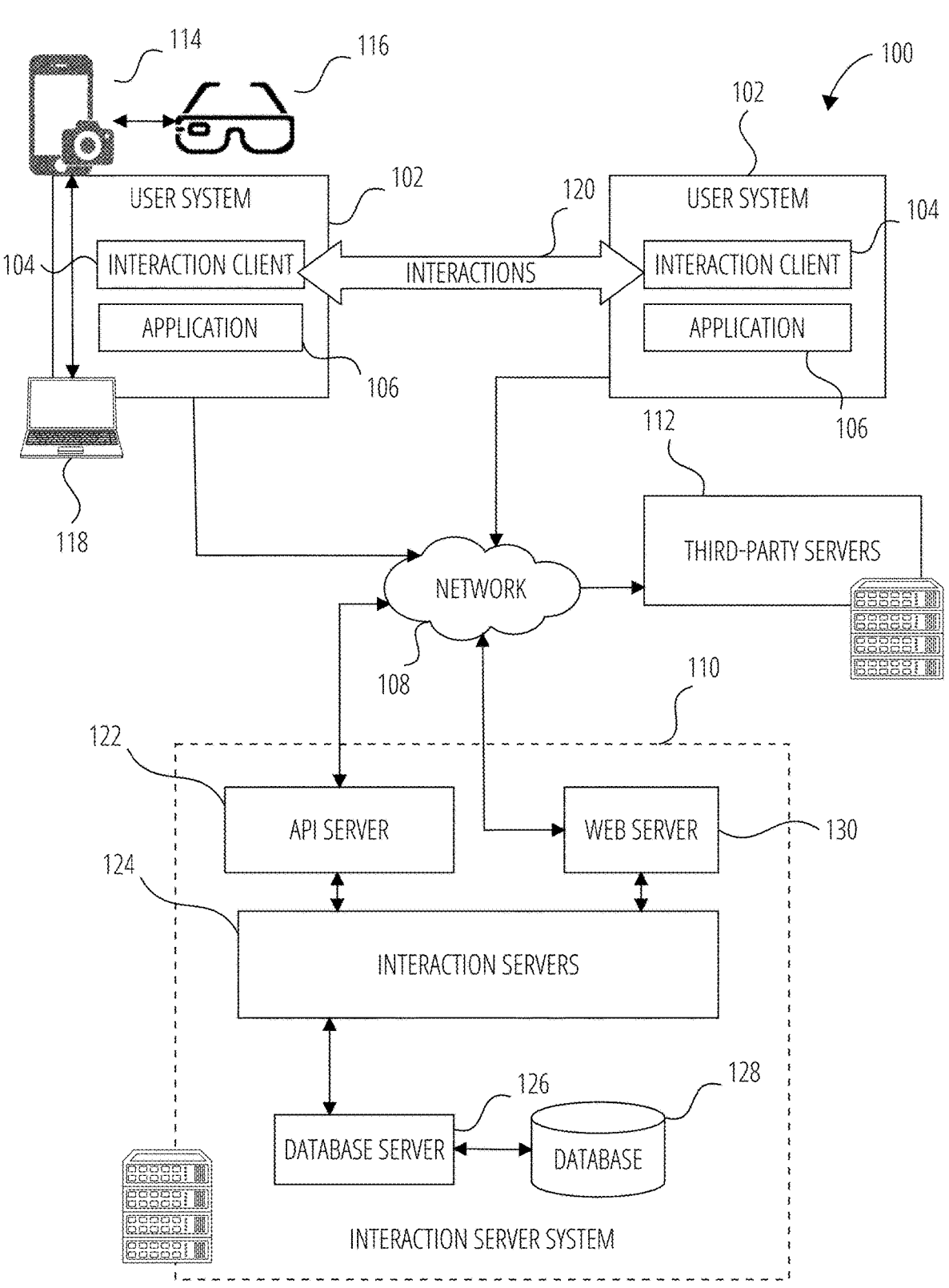
FIG. 1 is a diagrammatic representation of a networked environment in which the present disclosure may be deployed, according to some examples.

For purposes of the present disclosure, the terms "message" and "media content item" are used synonymously. As will be readily apparent from the description of the various figures that follow, a message or media content item may consist of one or various parts—that is, individual content items, including, for example, text, audio, graphics, images, animations, photographs, video, augmentations, and/or effects. Interaction applications can provide for the exchange of messages in both a one-to-one (e.g., direct messaging) context, as well as a one-to-many context. In the case of one-to-many messaging, an interaction application may allow a sending user to specify or select multiple receiving users to receive a message.

A sticker is a graphical element, icon, or image, similar in concept to an emoji. However, while a set of stickers supported by an interaction system may include emojis, the concept of a "sticker" is broader in the sense that many stickers do not correspond with and represent a predetermined symbol. For instance, whereas emojis can be part of a standardized character coding system (e.g., the Unicode Standard), in some examples, the majority of stickers generally are not part of any standardized character coding system.

In creating a message, whether it be a direct message or a one-to-many message posted to a content feed, to a group of users, or to a content collection (e.g., a "story"), content creators may add to the content of the message one or more digital stickers (in some cases, the message content consists exclusively of a sticker). Typically, the stickers are maintained and managed by a sticker system or subsystem that is part of, or otherwise associated with, the interaction application. In some instances, a sticker can be customized or personalized, for instance, to reflect characteristics of the content creator. For example, a sticker can comprise an avatar that has been configured by a user to convey a likeness of the user. As another example, a sticker can be an animated graphic that includes attributes of the user (e.g., the head of the user added to a predefined animation). Similarly, a sticker can be customized to reflect an attribute or characteristic of a location from which a message is being created and shared, or an event occurring at the time the message is being created and shared. Accordingly, customized and/or personalized stickers help content creators better to convey their message and improve overall engagement.

Implementations of sticker systems can therefore provide greater flexibility in creating diverse and meaningful content that can be more expressive and engaging than conventional characters or emojis. Given that a sticker system utilized by an interaction application can include considerably more stickers than any conventional emoji set, it can be challenging for a sending user to identify an appropriate sticker, or quickly select a desired sticker, when composing a message to be communicated with one or more receiving users. In some cases, finding the right sticker for a particular context can be tedious and time-consuming, requiring the user to navigate multiple pages or tabs with information.

To facilitate selection of stickers, an interaction system provides a user with sticker recommendations, such as one or more suggested stickers that are possibly relevant to a message that a sending user intends to convey. In some cases, an interaction application generates "smart" sticker suggestions. Suggestions can be generated based on text added to an input field by the user or based on the content and/or context of a user conversation within the messaging interface.

In some examples, a machine learning model, also referred to herein as a graphical element recommendation model, may be used within the interaction system to generate recommendations for graphical elements. A sticker recommendation model is an example of such a graphical element recommendation model. While descriptions herein focus primarily on sticker recommendations, it is noted that at least some of the systems, methods, or techniques described herein could also be applied or leveraged for other types of graphical element recommendations.

In some examples, a sticker recommendation model is trained to identify specific attributes or characteristics, such as text included in a message, stickers used in a message, or other contextual metadata, and to process the attributes or characteristics to identify a predetermined number of candidate items. In some cases, the candidate items are specific stickers, while in other cases the candidate items are output by the sticker recommendation model in the form of tags (e.g., sets of keywords or specific categories) that can be used by the interaction system to retrieve stickers. To generate the most suitable (or likely to be suitable) candidate items, the sticker recommendation model may score a plurality of candidate items and select a subset of the candidate items to recommend, based on their scores.

In use, when a user is viewing a received message, for example, the user might want to generate a reply message. In some examples, a sticker recommendation model is trained to generate relevance scores that can be used in selecting some predetermined number of recommended stickers that the user can use in the reply message. For example, when the user is viewing the received message, a reply interface is presented with the message that the user is viewing, such that a set of recommended stickers are presented with the reply interface, allowing the user an opportunity to quickly select and send a sticker as a response or reply to the message that the user is viewing. In some examples, a specific sticker (e.g., the most relevant sticker) is presented to the user in a dedicated location, e.g., as a sticker search icon adjacent to a text input field.

While a sticker recommendation model as described above can facilitate the use of sticker functionality and improve efficiencies or engagement within an interaction system, some sticker recommendation models generate suboptimal output. For example, a sticker recommendation model can generate recommended stickers that are not relevant to a message to which a user intends to reply, or to the context of a user conversation. This could be due to a number of technical issues, such as insufficient training data, noisy training data, overfitting, lack of model complexity, or limitations with respect to the underlying architecture or algorithms of the model. Further, some sticker recommendation models may be better suited to certain use cases than others.

To address these technical challenges, it is desirable to evaluate the quality of a graphical element recommendation model such as a sticker recommendation model, for example, in order to assess the performance of the model or its suitability for a particular implementation, to identify a model with possible underlying technical issues, to compare multiple models, or to dynamically select an appropriate model for a particular use case.

From an evaluation perspective, one option is to assess the output of a sticker recommendation model and manually check or verify whether, or to what extent, the output is of suitable quality (e.g., sufficiently relevant, sufficiently diverse, or sufficiently covers available outputs). However, as mentioned above, a sticker system includes a large number of stickers, and it would also be necessary to evaluate multiple sticker recommendation models in order to produce comparative data. As such, it is infeasible to perform such assessments manually. Furthermore, manual assessments are inconsistent and can introduce unwanted bias. Accordingly, a computing system is required to evaluate sticker recommendations produced by a sticker recommendation model.

Examples described herein comprise techniques for evaluation of graphical element recommendations, such as sticker recommendations. In some examples, the techniques described herein address technical hurdles to perform such evaluations. Techniques described herein also facilitate comparisons of sticker recommendation models, such as by enabling automated or near-automated quality comparisons. In some examples, the techniques are applied in the context of an interaction system that provides a messaging application or service.

According to some examples, a system accesses a set of text queries and provides each text query as input to a pre-trained machine learning model, such as a sticker recommendation model or other graphical element recommendation model.

In some examples, the system obtains, from the pre-trained machine learning model, at least one sticker recommendation for each text query. As mentioned, a sticker recommendation can include one or more candidate items and a score (e.g., a relevance score) for each candidate item. The pre-trained machine learning model can output a candidate item in the form of a sticker (or sticker identifier) or a tag, such as a text tag that can be used to locate potentially relevant stickers. As described further below, in some cases, the pre-trained machine learning model may return an "empty" result with no sticker recommendation.

The system can receive, from a user device, a selection of a model quality metric. According to some examples, a processor-implemented evaluation engine generates a model quality score for the pre-trained machine learning model by applying the model quality metric to the sticker recommendations. Output indicative of the model quality score can be presented at the user device.

The term "quality," as used herein in the context of the output of a machine learning model, may refer to various different elements, such as the relevance of output, the accuracy of output, coverage, diversity, or combinations thereof. The model quality metric utilized in the techniques referenced herein may include one or more of: a relevant recommendation ranking metric, a relevant recommendation probability metric, a coverage metric, a diversity metric, an end-to-end relevance metric, or a text relevance metric.

In some examples, objective or like-for-like comparison of models is enabled through the selection of a set of text queries that can be used consistently to assess the performance of multiple models. In this way, the identification of a suitable model (e.g., sticker recommendation model) is facilitated through uniform assessments, while also enabling the identification of models that may be performing suboptimally, thereby making it easier to diagnose or address technical issues in such models. This can, in turn, lead to improvements in the functioning or performance of an interaction application, such as by allowing a model to be adjusted to provide more relevant sticker recommendations, or to allow for dynamic selection of a better performing model in a particular context.

When the effects in this disclosure are considered in aggregate, one or more of the methodologies described herein obviate a need for certain efforts or resources that otherwise would be involved in the evaluation of graphical element recommendations, such as in the evaluation of the quality of outputs of a sticker recommendation model, or in the dynamic selection or adjustment of a model that provides such recommendations. Computing resources used by one or more machines, databases, or networks may be more efficiently utilized or even reduced, such as a result of automatic assessment steps, as a result of a reduced number of user selections or processing operations required to perform an assessment, or as a result of dynamic model selections or adjustments. Examples of such computing resources may include processor cycles, network traffic, memory usage, graphics processing unit (GPU) resources, data storage capacity, power consumption, or cooling capacity.

Examples described in the present disclosure provide practical applications that enhance the functioning of computer systems, particularly in the context of messaging applications that utilize sticker recommendations. By making sticker recommendation evaluations more efficient, sticker recommendation quality can be improved, thereby reducing the time users spend searching through extensive sticker collections, streamlining the messaging process, and enhancing user satisfaction with quicker and more relevant responses.

Practical applications also extend to the automatic implementation of a selected model, and control of an interaction application using the selected model. For example, once an evaluation engine determines the most effective model based on one or more applied quality metrics, this model is dynamically integrated into or selected within the interaction system. The model can then directly influence and control recommendation functionality of the interaction application in real-time. In some examples, as users engage in conversations, the system automatically employs the selected model to analyze context and/or content of messages and to provide suggestions that are both relevant and timely.

In some examples, dynamic model selection and implementation not only enhance the responsiveness of the interaction system and/or interaction application but also ensure that the system can adapt to evolving user behaviors and preferences without manual intervention. Accordingly, examples described herein allow an interaction system to adapt and apply a best-performing model to user conversations, enhancing system performance and the interactive experience of digital communication platforms.

Networked Computing Environment

FIG. 1 is a block diagram showing an example interaction system 100 for facilitating interactions (e.g., exchanging text messages, conducting text, audio and video calls, or playing games) over a network. The interaction system 100 includes multiple user systems 102, each of which hosts multiple applications, including an interaction client 104 (as an example of an interaction application) and other applications 106. Each interaction client 104 is communicatively coupled, via one or more communication networks including a network 108 (e.g., the Internet), to other instances of the interaction client 104 (e.g., hosted on respective other user systems 102), an interaction server system 110, and third-party servers 112. An interaction client 104 can also communicate with locally hosted applications 106 using Application Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to deploy particular technology and functionality within the interaction server system 110 initially, but later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, content augmentation (e.g., filters or overlays), message content persistence conditions, entity relationship information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104). The interaction servers 124 host multiple systems and subsystems, described below with reference to FIG. 2.

System Architecture

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture. Example subsystems are discussed below.

An image processing system 202 provides various functions that enable a user to capture and augment (e.g., annotate, or otherwise modify or edit) media content associated with a message. A camera system 204 includes control software (e.g., in a camera application) that interacts with and controls hardware camera hardware (e.g., directly or via operating system controls) of the user system 102 to modify and augment real-time images captured and displayed via the interaction client 104.

An augmentation system 206 provides functions related to the generation and publishing of augmentations (e.g., filters, media overlays, or other digital effects) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, stickers, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates. In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

Figure 3:
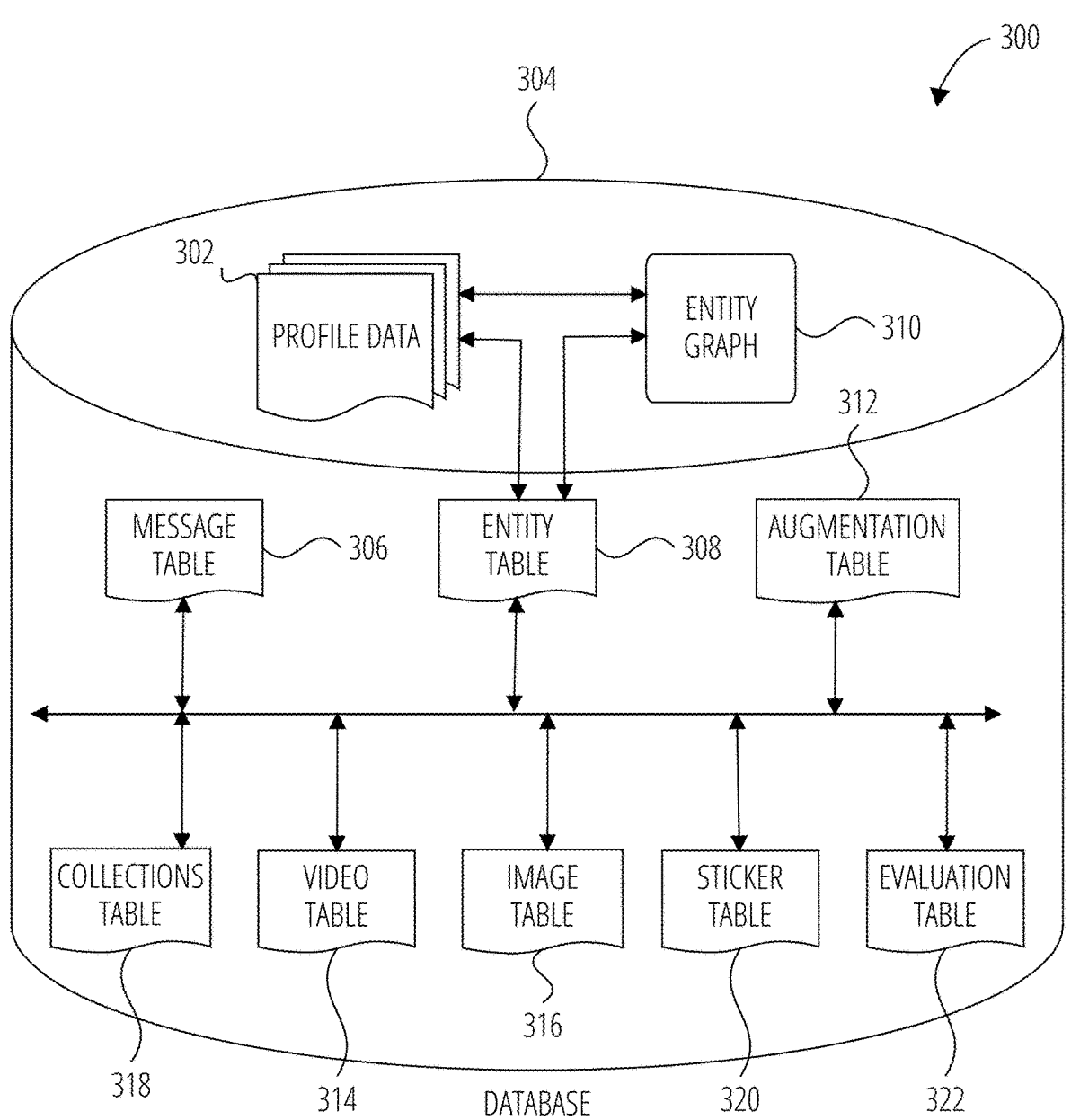
FIG. 3 is a diagrammatic representation of a data structure as maintained in a database, according to some examples.

A user management system 218 is operationally responsible for the management of user data and profiles, and maintains entity information (e.g., stored in entity tables 308, entity graphs 310 and profile data 302 of FIG. 3) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

Referring to "stories" generally, a story is a specific type of message that is usually a collection of images or videos divided into several short sequences. A story may be accompanied by backgrounds, music, audio, texts, stickers, animations, effects and emojis. In some cases, the aim of posting a story is to tell a narrative (e.g., an everyday experience) or to convey a message. In many instances, once a story has been posted, the story may only be available for viewing by others for a short time (e.g., twenty-four hours). Within the interaction system 100, content creation tools may allow a content creator to add a hashtag or specify a location to provide further context for a story.

A map system 222 provides various geographic location functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate (e.g., apply a visual augmentation to) images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic.

The artificial intelligence and machine learning system 230 may also provide chatbot functionality to message interactions 120 between user systems 102 and between a user system 102 and the interaction server system 110. The artificial intelligence and machine learning system 230 may also provide generative functionality, e.g., allowing a user to generate text, image, or video content based on prompts. The artificial intelligence and machine learning system 230 may work with the audio communication system 216 to provide speech recognition and natural language processing capabilities, allowing users to interact with the interaction system 100 using voice commands. The artificial intelligence and machine learning system 230 also interacts with a sticker system 232 of the interaction system 100, as described further below.

Figure 4:
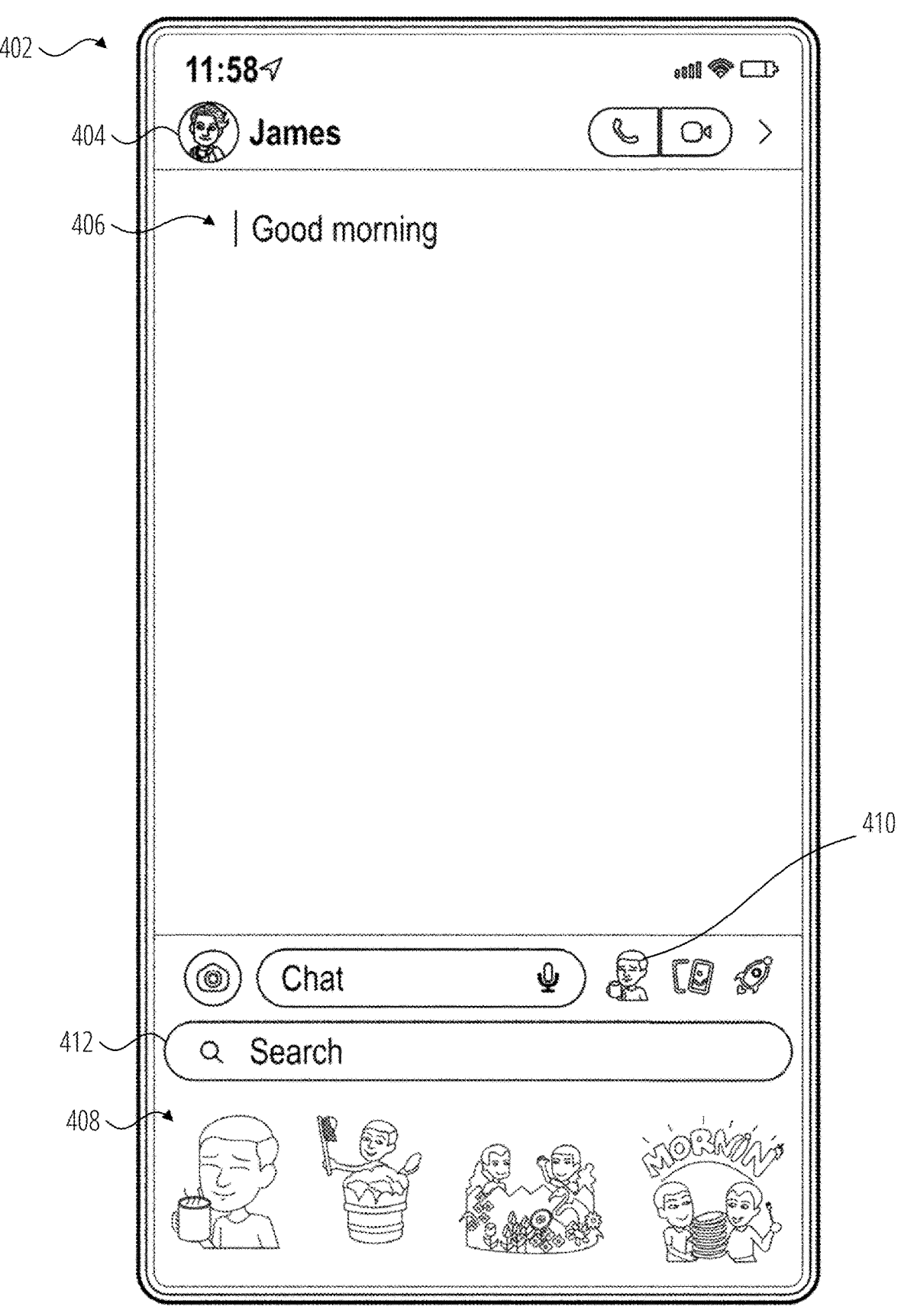
FIG. 4 is a user interface diagram illustrating a messaging interface of an interaction application, wherein recommended stickers are presented based on a user conversation, according to some examples.
Figure 5:
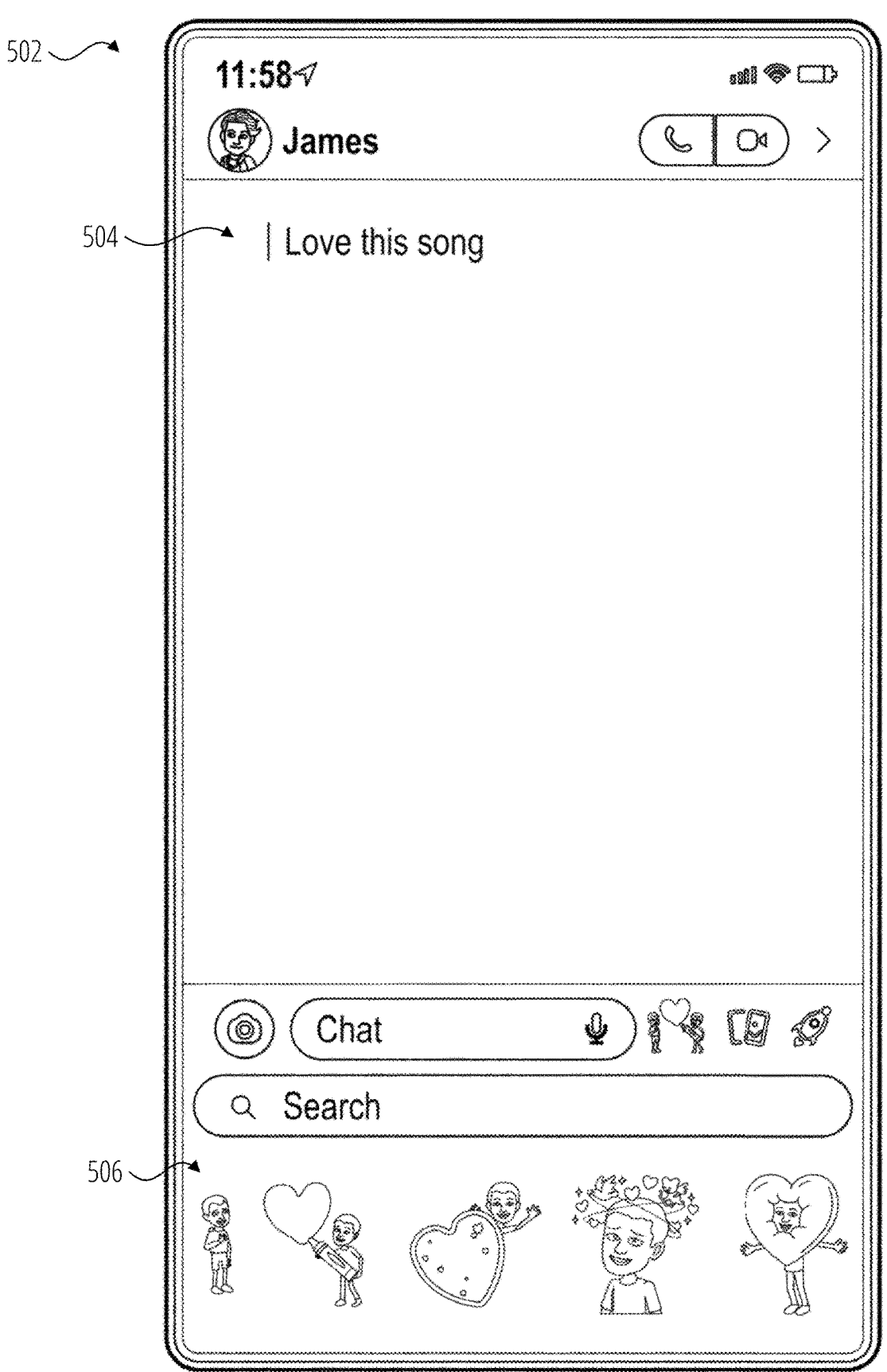
FIG. 5 is a user interface diagram illustrating a messaging interface of an interaction application, wherein recommended stickers are presented based on a user conversation, according to some examples.
Figure 6:
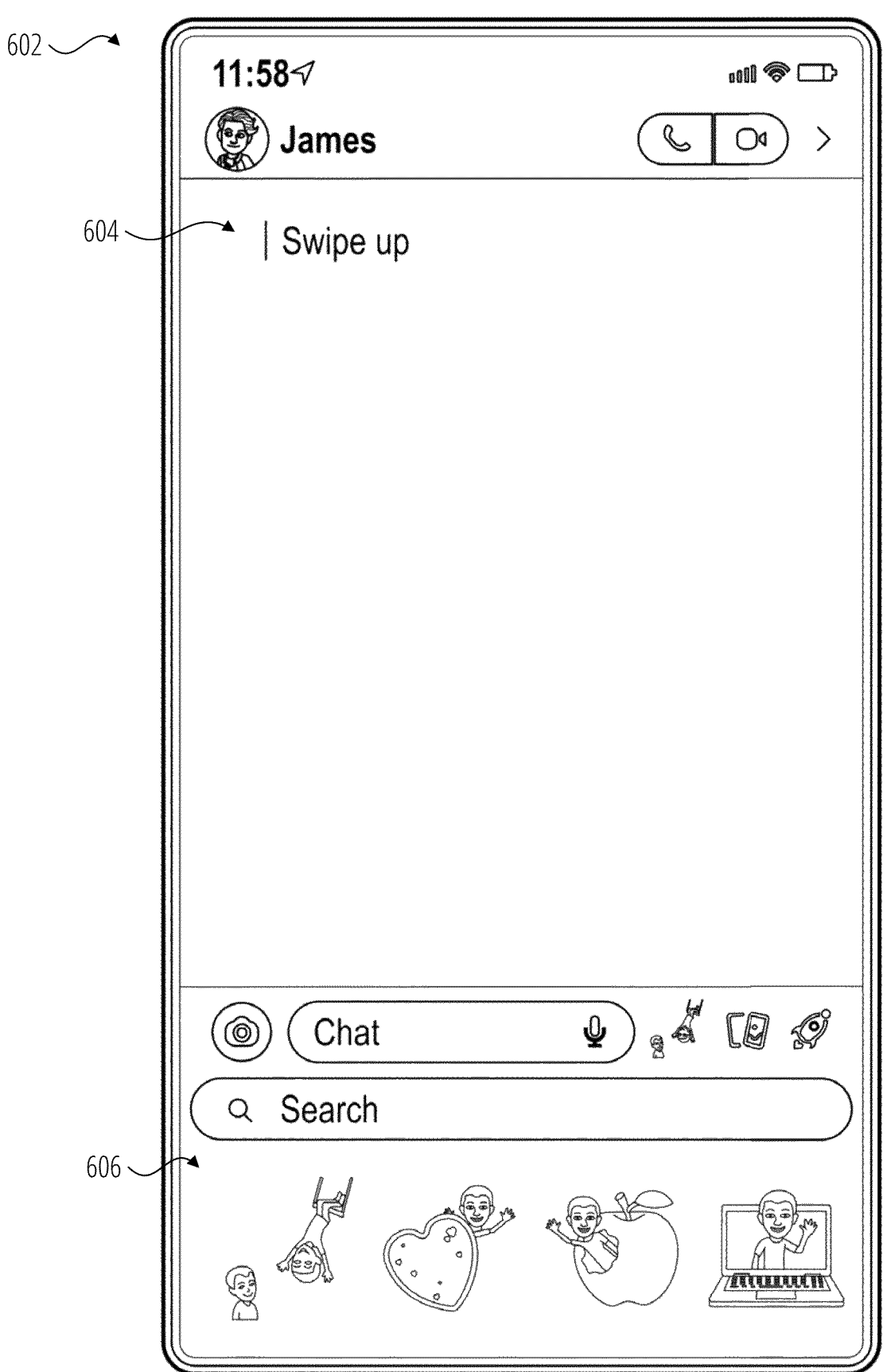
FIG. 6 is a user interface diagram illustrating a messaging interface of an interaction application, wherein recommended stickers are presented based on a user conversation, according to some examples.

A sticker system 232 is an example of a graphical element system or subsystem of the interaction system 100. The sticker system 232 provides various sticker functions within the context of the interaction system 100, such as within the messaging system 210. Some examples of stickers are shown in FIG. 4 to FIG. 6 and described below. A sticker can be placed or added (e.g., at a user-defined position) within a message. A sticker can accompany other content (e.g., text and/or images) within a message. Alternatively, a sticker can itself correspond to the entirety of a message.

The sticker system 232 may implement a sticker recommendation, or sticker suggestion, feature that is configured to select, from among the collection of available stickers, one or more suggested stickers for use in a message. For example, when a user is viewing a particular media content item (e.g., a message with media content, a story, etc.)

communicated to the user by another user, the interaction client 104 invokes the sticker suggestion service to generate and present a selection of recommended stickers that may be used in a reply message. As another example, when a user opens a messaging interface (e.g., a chat window), the interaction client 104 invokes the sticker suggestion service to generate and present one or more suggested stickers as a "conversation starter."

The sticker suggestion feature may utilize a sticker recommendation model, such as a pre-trained machine learning model implemented by the artificial intelligence and machine learning system 230. The sticker recommendation model is an example of a graphical element recommendation model.

In some examples, the machine learning model takes, as input, features one or more of various attributes or characteristics, such as attributes or characteristics of a message that has been received and viewed by the end user. In addition, in some examples, the machine learning model takes as input features one or more of various attributes or characteristics of a sending user and/or a receiving user. The machine learning model may be trained to generate relevance scores for candidate items, such as stickers or tags, based on input features provided to the model, and to output suggested stickers based on the relevance scores. In some examples, a rules-based selection algorithm may be used to filter or select relevant stickers. In some examples, the machine learning model outputs a relevance score for each candidate item, and a sticker search engine is used to locate relevant stickers corresponding to the candidate items. The sticker search engine may also score the stickers corresponding to each search query.

Various methods may be used to generate a model (e.g., a machine learning model) that is used to derive relevance scores for candidate items that may be appropriate for use in a particular context. For example, where a model is to be trained to provide a "smart reply" functionality, the artificial intelligence and machine learning system 230 may utilize a supervised machine learning algorithm to generate a pre-trained model. Training data may reflect historical user behavior with respect to selecting reply stickers. For example, for some period of time, and only with user consent, each time a message recipient selects a sticker to use as a reply to a received message, attributes and characteristics of the received message, attributes and characteristics of the sender of the message, and attributes and characteristics of the recipient of the message may be captured and stored for subsequent use as a single instance of training data. Once a sufficient volume of training data has been obtained, the training data can be used (again, only with user consent) to train the machine learning model to generate relevance scores for stickers. In this way, the sticker recommendations that are derived by the model are learned, in the sense that the recommendations are derived based on actual observed historical data.

By way of example, if a specific sticker is frequently selected for use as a reply message when the sender of the message is in a specific location, this behavior is reflected in the training data and the model will be trained to recommend the specific sticker under the correct circumstances—e.g., when the sender of the message is located in the specific location at the time of sending the original message. As another example, if a specific sticker, e.g., a waving person, is frequently used in response to a certain message, e.g., a message with the text "Good Morning," this behavior is reflected and the model will be trained to recommend the specific sticker in the relevant cases where a message includes "Good Morning" or similar content.

In some examples, once the model has been trained, the model is used to generate relevance scores based on input features provided to the model reflecting one or more of various attributes or characteristics of a received message. In some examples, the model receives only the content (e.g., text) of the message itself as an input query.

For example, in some instances, the output of a model is a relevance score associated with a category or tag to which stickers are assigned or otherwise associated with. Accordingly, the relevance score for any particular tag, as output by the model, is an indication of the likelihood that a user would be interested in selecting a sticker associated with the tag in a message, such as as a reply sticker. In other examples, the relevance score is associated with individual stickers.

When an end user receives a message or media content item, whether that message has been sent directly to the user or shared more broadly (e.g., as a content collection that is viewable by many), the pre-trained model is invoked to generate relevance scores used in the selection of stickers that may be recommended for use in a reply to the received message. With some examples, the model generates relevance scores for each of several tags, where each tag represents a text response, text query, or category of supported stickers. The "tag" output by the sticker recommendation model might, for example, be a predicted answer or predicted response to a specific message, e.g., selected from a supported set of answers or responses. In some examples, and as described further below, a tag generated by the sticker recommendation model is fed to a sticker search engine to produce one or more stickers based on the tag. The sticker search engine may generate a relevance score for each sticker that it returns, such that the stickers ultimately presented can be ranked according to the relevance scores produced by the sticker search engine.

Accordingly, in some examples, a sticker recommendation model generates a relevance score for each tag, and a sticker search engine generates a relevance score for each search result that corresponds to the tag.

In some examples, the sticker system 232 is configured to maintain a collection of stickers that are available for messaging with respect to the interaction client 104. Accordingly, with some examples, in addition to maintaining the stickers, the sticker system 232 has and maintains a taxonomy, or a hierarchy of categories or tags, used to organize or identify the available stickers. For instance, a sticker identifier or ID, uniquely identifying a specific sticker, is assigned to one or more categories, and is associated with metadata such as one or more tags. Accordingly, at least with some examples, the pre-trained machine learning model is a classifier, and may generate a relevance score for each of several categories or tags, such that stickers that are associated with the highest scoring categories or tags can be selected for presenting to a message recipient as recommended reply stickers.

By way of example, various stickers can convey a message relating to a holiday—e.g., "Happy Holidays," "Merry Christmas," or "Happy St. Paddy's Day." These stickers may then be associated with or assigned to a tag (e.g., a holiday tag), indicating that the stickers are associated with a holiday. When a user receives a message, various attributes and characteristics of the message, the sender, and the recipient of the message, are provided as input to the pre-trained machine learning model. If the category or tag for holidays receives a high relevance score as output by the machine learning model, then one or more of the stickers assigned to that category or tag may be selected for presenting to a user as a suggested reply sticker. As another example, each sticker may include metadata in the form of one or more text tags that describe the sticker and are linked to the sticker ID. The sticker recommendation model may analyze a message provided to it as input and output a text tag, e.g., one of a plurality of text tags supported by the interaction system 100. The sticker system 232 may then select one or more stickers that include that output text tag, or closely match the output text tag.

As mentioned, the sticker system 232 may implement a sticker search engine that provides a sticker search function. In some cases, the user may manually enter a search query, and in other cases the sticker system 232 may implement an automatic sticker search function without the user explicitly entering a query in a dedicated search field. For example, in response to a user adding text to an input field (as opposed to a dedicated search field), or in response to a user sending a message with text content, the sticker system 232 may initiate an automatic sticker search to surface a set of stickers that are determined to be relevant to or similar to the text. In other words, the text typed or sent by the user may automatically be applied as a search query to the sticker search engine.

In some examples, and as alluded to above, output of the sticker recommendation model (e.g., a category or tag) is fed into the sticker search engine in order to obtain stickers that are relevant to the output of the sticker recommendation model. For example, the sticker search engine may perform a search for stickers that include metadata matching the text tag predicted by the sticker recommendation model. In some examples, the stickers are ranked and/or presented based on relevance scores.

A sticker recommendation service can thus, in some examples, include a recommendation component and a searching component. In such cases, the recommendation component outputs a tag or category based on one or more input features, while the searching component performs a search to retrieve one or more stickers that match (or are closely related to) the tag or category. In some examples, and as described further below, it may be desirable to evaluate both a recommendation component (e.g., the component that generates a tag) and a searching component (e.g., the component that retrieves the stickers) by using an "end-to-end" metric. However, in other examples, a sticker recommendation model can directly output a suggested sticker (e.g., a list of sticker IDs) instead of outputting tags or categories for use in downstream searching, and, in such examples, it may be desirable to evaluate only the sticker recommendation model that provides the suggested stickers directly.

As mentioned above, it may be desirable to evaluate the quality of a sticker recommendation model. In FIG. 2, the sticker system 232 is shown to include an evaluation engine 234. In some examples, the evaluation engine 234 is a processor-implemented component that applies one or more of various model quality metrics in order to generate model quality scores that are useful in assessing or comparing the quality of sticker recommendation models, as described in greater detail below. The evaluation engine 234 may receive, as input, the outputs of the sticker recommendation model, and automatically process the outputs to provide an indication of the performance of the model with respect to one or more metrics, e.g., relevant recommendation probability, or model diversity. The evaluation engine 234 may work with the artificial intelligence and machine learning system 230, such as in cases where a metric is applied by executing a quality scoring machine learning model.

Data Architecture

FIG. 3 is a schematic diagram illustrating data structures 300, which may be stored in a database 304 of the interaction server system 110 (e.g., the database 128 or another database), according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 10.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

A sticker table 320 stores various data relating to graphical elements in the form of digital stickers that may be associated with media content items or messages. By way of example, the sticker table 320 may store, for each sticker, a unique sticker identifier (ID), which may then be associated with various categories, tags and/or other metadata. The sticker system 232 may define a set of supported categories or tags that can be linked to stickers. For example, the ID may be associated with tags in the form of keywords and with a sticker type, e.g., "avatar category." The sticker table 320 may also store sticker selection history data of a user. For example, the sticker table 320 may store a set of the ten, or twenty, or thirty most recently used stickers of the user. As described elsewhere, a "smart" reply sticker recommendation feature may utilize a machine learning model to generate relevance scores for stickers, or for the tags associated with the stickers, based on attributes or characteristics of a message. In the present disclosure, "candidate items" may include stickers and/or tags, depending on the context.

In some examples, the sticker system 232 is a distributed system, such that the sticker system 232 resides in part on each user system 102. Accordingly, at least with some examples, a machine learning model may generate the relevance scores for selecting stickers at the user system 102. Similarly, in some examples, a predefined set of stickers is stored locally at the user system 102, e.g., a periodically updated set. For example, a predefined number (e.g., ten, twenty, or thirty) of the most recently used stickers (for a specific user associated with an interaction client 104 running on a user system 102) are stored locally at the user system 102.

In some examples, a sticker recommendation service (e.g., as provided via a sticker recommendation model and/or a sticker search engine) is implemented so as to run fully locally at a user system 102. To enhance user privacy, data relating to the sticker recommendation service may be maintained only locally at the user system 102 and/or be appropriately encrypted.

An evaluation table 322 stores various data relating to the evaluation or scoring of sticker recommendation models. For example, the evaluation table 322 stores a message data set that includes historic message data of the interaction system 100. The evaluation engine 234 may be used to select, from the message data set, a set of queries (e.g., a set of text queries) that is to be used to evaluate one or more models, as described further below. The evaluation table 322 may further include data relating to various model quality metrics. For example, the evaluation table 322 stores rules or settings to be applied when the evaluation engine 234 performs an assessment of model quality based on a particular model quality metric. Further, the evaluation table 322 may store historic evaluation results, such as model quality scores generated for one or more sticker recommendation models used (or considered for use) within the interaction system 100. For example, the evaluation table 322 can store comparative data that compares the performance of two models, assessed on the same set of input queries, with respect to a selected model quality metric.

FIGS. 4-6 are user interface diagrams to illustrate, by way of example, differences in the quality of outputs generated by a sticker recommendation model, according to some examples. Specifically, in FIG. 4, a sticker recommendation model generates recommendations that can be regarded as highly relevant, while in FIG. 5 a sticker recommendation model generates recommendations that can be regarded as slightly or somewhat relevant, and in FIG. 6 a sticker recommendation model generates recommendations that can be regarded as irrelevant, as will become apparent from the descriptions that follow.

Referring firstly to FIG. 4, the user interface diagram illustrates a messaging interface of an interaction application, in the example form of a reply interface 402, as may be presented on the display of a mobile device 114 (as an example of a user system 102) by the interaction system 100, according to some examples. The reply interface 402 enables a user to view and interact with messages received from another user, as identified by a user identifier 404, and to compose and send messages to the other user.

Upon receiving a message 406, and in particular, when the active user invokes the messaging or interaction client 104 to view the message 406, the messaging or interaction client 104 will communicate a request to the sticker system 232 for recommended stickers that might be used as, or with, a reply message. The sticker system 232 processes the request by providing the content of the message 406, optionally together with contextual data, as described above, to a pre-trained machine learning model in the form of a sticker recommendation model.

The sticker recommendation model outputs relevance scores used in selecting stickers to present as recommended reply stickers. With some examples, the relevance scores output by the machine learning model are associated with specific tags, such that the recommended stickers may be selected for recommending to the message recipient based on those stickers being assigned to or associated with tags that have relevance scores exceeding some threshold, as determined by the model. Accordingly, the sticker system 232 may select some predetermined number of stickers (e.g., 4, 5, 6, 7, 8, 9, or 10 stickers) associated with one or more tags having relevance scores, as determined by the output of the pre-trained machine learning model, which exceed some threshold. With some examples, the final determination of the recommended stickers is driven in part by the relevance scores, but also take into consideration other input data.

In some examples, the sticker system 232, after identifying the stickers to recommend as reply stickers, will communicate an indication of the recommended stickers to the interaction client 104 of the user. For instance, with some examples, the indication is a sticker ID for each sticker being recommended as a reply message. As another example, the sticker system 232 communicates one or more tags to the interaction client 104, and the interaction client 104 performs a sticker search to surface the relevant stickers associated with the tags. Accordingly, the messaging or interaction client 104 will update the presentation of the original media content item or message by presenting, with the original message, the reply interface 402 that includes a user-selectable sticker for each of the several stickers identified as recommended reply stickers.

In FIG. 4, four recommended stickers 408 are presented to the user. In this case, the message 406 states "Good morning," and the recommended stickers 408 generated in response to the message 406 are all relevant to this text (e.g., they can all be regarded as conveying a message, emotion, or feeling that can be deemed relevant to the "Good morning" message). Thus, the recommended stickers 408 can be regarded as highly relevant output.

The user may send a sticker from the recommended stickers 408 to the receiving user, either as a standalone message or together with other message content (e.g., text). In FIG. 4, the reply interface 402 also includes a search icon 410 that is adapted to represent one of the recommended stickers 408.

In some examples, and as shown in FIG. 4, the search icon 410 represents the recommended sticker 408 that has the highest relevance to a tag generated by the sticker recommendation model. In other words, the appearance of the search icon 410 is adapted such that it is displayed as a thumbnail-type version of the recommended sticker 408.

The interaction client 104 may receive user input to select the search icon 410, such as through a tapping gesture directed at the search icon 410. Responsive to receiving the user input to select the search icon 410, the interaction client 104 presents a sticker search panel that allows the user to navigate through various categories of stickers. The reply interface 402 also provides a search query field 412 which the user can use to enter a query. In response to a query, a sticker search engine performs an automatic sticker search to present a set of stickers that are similar to or match the query.

Referring now to FIG. 5, the user interface diagram illustrates a messaging interface of an interaction application in the example form of a reply interface 502 that is functionally similar to the reply interface 402. In the case of FIG. 5, the user receives a message 504 with the text "Love this song," and a set of recommended stickers 506 is presented using the technique described with reference to FIG. 4. In FIG. 5, the recommended stickers 506 generated in response to the message 504 are partially or somewhat relevant to the text, because they appear to convey the "love" aspect of the message 504, but do not appear to sufficiently incorporate the "song" or "music" aspect.

Turning to FIG. 6, the user interface diagram illustrates a messaging interface of an interaction application in the example form of a reply interface 602 that is functionally similar to the reply interface 402. In the case of FIG. 6, the user receives a message 604 with the text "Swipe up," and a set of recommended stickers 606 is presented using the technique described with reference to FIG. 4. In FIG. 6, the recommended stickers 606 generated in response to the message 604 do not appear to be relevant, because they do not include, denote, or convey a message, action, instruction, or emotion relating to "swiping up."

Figure 8:
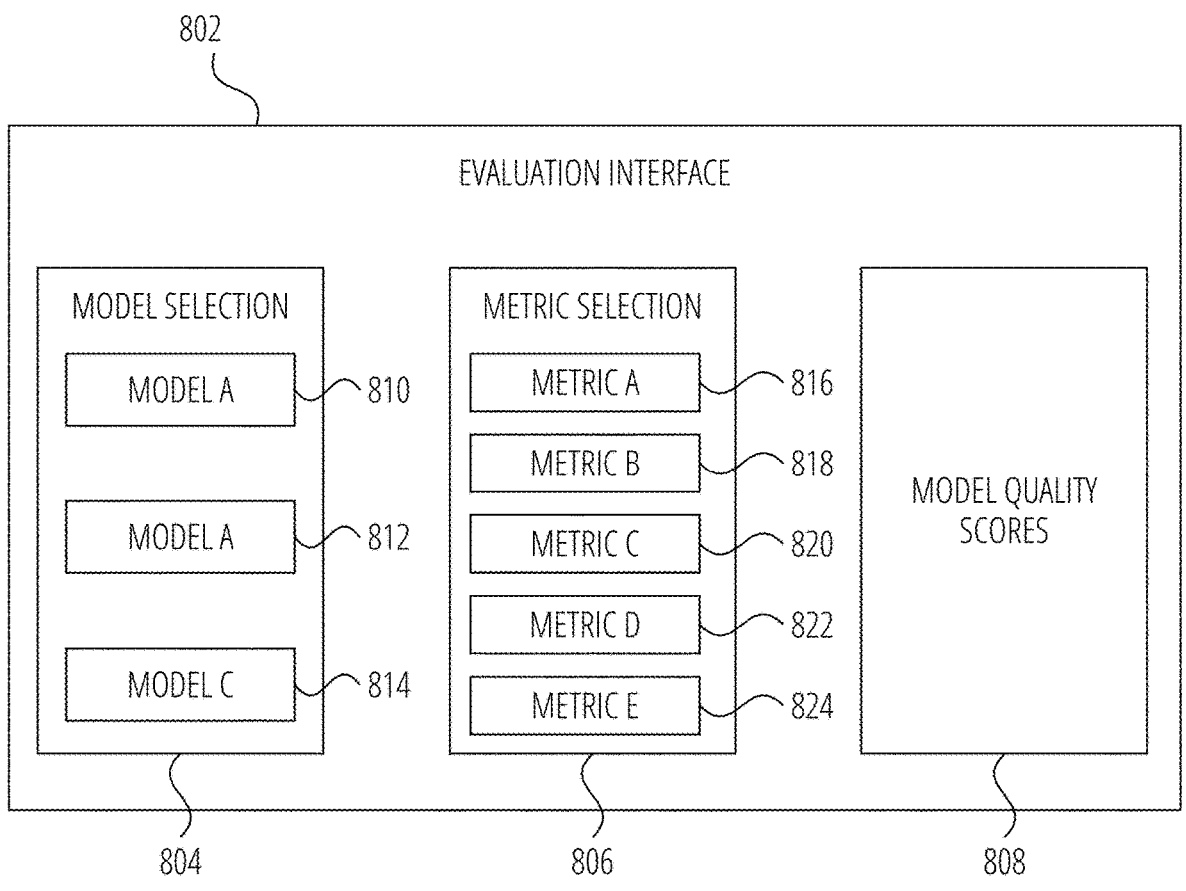
FIG. 8 is a user interface diagram illustrating an evaluation interface, according to some examples.

A user or administrator might, for example, wish to evaluate a particular sticker recommendation model. FIG. 8 illustrates an evaluation interface 802, according to some examples. The evaluation interface 802 can, for example, be accessed by a user or administrator of the interaction system 100 with suitable access rights, e.g., via a user system 102. For example, the administrator may wish to evaluate one or multiple of the sticker recommendation models available within the interaction system 100, shown in FIG. 8 as model A 810, model A 812, and model C 814, which are displayed in a model selection section 804. The administrator may then select one of the models via the evaluation interface 802.

In other examples, the interaction system 100 performs a fully automated process in which one or more of the models (e.g., model A 810, model A 812, and model C 814) are evaluated without an explicit user instruction to do so. For example, the evaluation engine 234 periodically, or in response to an addition of or change to a model, performs such a process.

FIG. 7 is a flowchart illustrating a method 700 for evaluation of a graphical element recommendation model, such as a sticker recommendation model, according to some examples. The method 700 is performed, in some examples, by various subsystems of the interaction system 100, such as the artificial intelligence and machine learning system 230 and/or the evaluation engine 234 of the sticker system 232. Accordingly, such subsystems are referenced below.

The method 700 commences at opening loop element 702 and proceeds to operation 704, where the evaluation engine 234 accesses a message data set. The message data set may include various types of historic message data. For example, the message data includes message content or data relating to messaging operations within the interaction application, such as common text used in chat messages or common historic search queries used to search for stickers. In some examples, the message data set includes only publicly available message data, such as public "stories" and public message "captions" shared by users within the interaction system 100, while private message data of users remain private and are not accessed by the evaluation engine 234.

In some examples, the message data set includes both non-private data from the interaction system 100 and publicly available data from other interaction systems, such as open source queries. Any use of user data is performed only with user approval and deleted on user request. In addition, appropriate technical and organizational measures are implemented to ensure the security and confidentiality of information.

The method 700 then proceeds to operation 706, where the evaluation engine 234 automatically selects a set of queries from the message data set. For example, the queries may include a set of common (e.g., the top 500 or top 1000) search queries and/or a set of common (e.g., the top 500 or top 1000) public message captions. Queries may thus be selected based on their frequency within the message data set. The operation 706 may include filtering the message data to remove irrelevant or undesirable data, such as content in certain languages, hashtags, stop words, and so forth.

In some examples, the final set of queries selected by the evaluation engine 234 are regarded as a "validation set" used for validating or checking the relevance or quality of a sticker recommendation model. In other words, the term "queries" is used, because the queries are selected for use as inputs to the sticker recommendation model in order to subsequently assess its outputs. As alluded to above, in some examples, the same set of queries can be used consistently to assess the performance of multiple models, providing a uniform assessment and comparison tool.

In some examples, the set of queries include text queries. The term "text," as used in this context, should be broadly interpreted, and may include characters, words, numbers, digits, symbols (including, for example, emojis that can be expressed using a coding system such as the Unicode Standard), and so forth.

At operation 708, each query is provided as input to the relevant sticker recommendation model (e.g., the model selected from the available models shown in FIG. 8) to obtain sticker recommendations. The evaluation engine 234 may pass the queries to the artificial intelligence and machine learning system 230 for generation of model output. In some examples, for each query, the sticker recommendation model generates a recommendation that includes a candidate item and a relevance score associated with that candidate item. The candidate item can, for example, be a tag indicative of a predicted response to the query (usable to locate stickers corresponding to the tag). The sticker recommendation model may generate multiple recommendations for each query. In certain instances, the sticker recommendation model may produce an empty recommendation, for example, where it is unable to generate a prediction or response to the query.

The evaluation engine 234 receives a user selection of a model quality metric, at operation 710, and generates a model quality score by applying the selected model quality metric to the sticker recommendations of the sticker recommendation model (operation 712). The user selection of the model quality metric may be received, for example, via a suitable user interface, such as the evaluation interface 802. A user or administrator may view a metric selection section 806 of the evaluation interface 802 that displays available model quality metrics against which the relevant model can be evaluated, shown in FIG. 8 as metric A 816, metric B 818, metric C 820, metric D 822, and metric E 824. The user or administrator may then select one of the metrics via the evaluation interface 802. Non-limiting examples of model quality metrics and the generation of model quality scores are provided below. In some cases, and as will be evident from the examples, a model quality score is generated by applying the model quality metric to the relevance scores for each sticker recommendation (or to probability scores generated based on the relevance scores).

It is noted that, while the method 700 of FIG. 7 is shown to include receiving a user selection of a model quality metric, in some examples, the model quality metric is pre-selected or automatically selected by the interaction system 100 without explicit user input. As mentioned, in some examples, the interaction system 100 performs a fully automated process in which one or more of the models (e.g., model A 810, model A 812, and model C 814) are evaluated without an explicit user instruction to do so, and can automatically select and/or apply one or more model quality metrics to perform the evaluation.

Once the model quality score has been determined, the method 700 proceeds to operation 714, where the evaluation engine 234 automatically compares the quality of the sticker recommendation model to the model quality scores of one or more other models used, or considered for use, within the interaction system 100. At operation 716, the sticker system 232 generates and causes presentation of output indicative of model quality. A model quality score and a comparison of the model quality score with historic scores generated for other models may be presented in a user interface of the user system 102. Such output is, for example, presented in a model quality scores section 808 as shown in FIG. 8. As mentioned, and as described with reference to FIG. 9, the sticker system 232 can use one or more model quality scores to dynamically select a sticker recommendation model for use by the interaction application (e.g., in a certain scenario or for a certain period of time). The method concludes at closing loop element 718.

End-to-End Relevance Metric

The end-to-end relevance metric is a first non-limiting example of a quality metric, which may be used alone or in combination with other quality metrics. The end-to-end relevance metric is applied by the evaluation engine 234 using classifications, or ratings, of each sticker presented based on recommendations of the sticker recommendation model. For example, each sticker is classified as "highly relevant" (see the examples in FIG. 4), "slightly relevant" (see the examples in FIG. 5), or "irrelevant" (see the examples in FIG. 6).

Stickers may be classified by user input or automatic techniques. For example, a machine learning model of the artificial intelligence and machine learning system 230 can be trained to compare the visual features of a sticker (and optionally also sticker metadata) with the content and/or context of a query, and to classify the sticker accordingly. For example, in the case of FIG. 5, the machine learning model can identify the hearts in the stickers as being associated with love, and also identify the absence of visual features relating to songs or music, and thus automatically classify the stickers as "slightly relevant."

Stickers are then scored based on their classification or rating. For example, the evaluation engine 234 allocates a score of 2 points to a highly relevant sticker, 1 point to a slightly relevant sticker, and −0.5 points to an irrelevant sticker (merely as examples). The scores are then added together by the evaluation engine 234 to obtain the model quality score for the end-to-end relevance metric. In some examples, only a subset of the stickers recommended by the sticker recommendation model are included in the assessment. For instance, only the stickers with highest relevance scores (e.g., the top 6, 8, or 10 stickers) for each query are classified and scored to obtain the model quality score. A higher model quality score, according to the end-to-end relevance metric, indicates higher quality recommendations.

As mentioned, a sticker recommendation service of the interaction system 100 may, in response to receiving a query, generate relevance scores for tags by using a sticker recommendation model, and then perform an automatic search to retrieve stickers matching those tags. With the end-to-end relevance metric, this metric may be regarded as "end-to-end" given that it provides an evaluation of both a recommendation component (that generates the tag) and a searching component (that retrieves the stickers).

Text Relevance Metric

The text relevance metric, which is also referred to as a tag relevance metric, is a second non-limiting example of a quality metric, which may be used alone or in combination with other quality metrics. The text relevance metric is applied by the evaluation engine 234 using classifications, or ratings, of each tag generated by the sticker recommendation model. For example, and as shown in Table 1 below (which shows only two queries to provide a simplified illustration), each tag can be classified as "relevant" or "irrelevant." In this case, the metric is not an end-to-end metric, as only the tags, and not the ultimate stickers, are assessed.

Tags are classified by user input or automatic techniques. For example, a machine learning model of the artificial intelligence and machine learning system 230 can be trained to compare the input query with the output of the sticker recommendation model, and to classify the tag accordingly. Tags are then scored based on their classification or rating. For example, the evaluation engine 234 allocates a score of 1 point to a relevant sticker and −1 point to an irrelevant sticker (merely as examples). The scores are then added together by the evaluation engine 234 to obtain the model quality score for the text relevance metric. In some examples, only a subset of the tags recommended by the sticker recommendation model are included in the assessment, e.g., only the tag with the highest relevance score for each query. A higher model quality score, according to the text relevance metric, indicates higher quality recommendations.

TABLE 1

| Examples of data used to apply a text relevance metric | | |
| --- | --- | --- |
| Query | Prediction (e.g., "smart reply tag") | Classification |
| Good morning | morning | Relevant |
| WOW | I love you | Irrelevant |

Relevant Recommendation Ranking Metric

The relevant recommendation ranking metric is a third non-limiting example of a quality metric, which may be applied alone or in combination with other metrics. The relevant recommendation ranking metric may be implemented as a type of end-to-end metric, or as a metric that assesses tags only.

Referring firstly to the assessment of tags only, in such cases, the relevant recommendation ranking metric may be referred to as a relevant text ranking metric, or RTR metric. The RTR metric ranks the positions of relevant text output in the output tags of the sticker recommendation model. As shown in Table 2 below (which shows only two queries to provide a simplified illustration), a plurality of sticker recommendations is generated for each query. Each sticker recommendation includes a tag and a relevance score, and the tags are arranged by relevance score.

The RTR metric is applied by the evaluation engine 234 using classifications of each tag. In the case of the RTR metric, one tag per query is identified as the most relevant and is marked "Relevant," while all other tags are marked "Irrelevant." Tags are classified by user input or automatic techniques, e.g., a machine learning model of the artificial intelligence and machine learning system 230 as described above.

The evaluation engine 234 then determines the ranking, or position, of the relevant sticker recommendation within the plurality of sticker recommendations. In Table 2, for the query "Good morning," the ranking is "4," as the most relevant tag has the fourth highest relevance score, while for the query "I love you," the ranking is "1," as the most relevant tag has the highest relevance score. The model quality score may then be determined by the evaluation engine 234 by aggregating the rankings, e.g., by calculating an average ranking across all queries in the set of text queries. A lower model quality score, according to the RTR metric, indicates better recommendations.

TABLE 2

| Examples of data used to apply a RTR metric | | | |
| --- | --- | --- | --- |
| Query | Prediction (e.g., "smart reply tag") | Relevance score (generated by model) | Classification |
| Good morning | Let's go | 0.6 | Irrelevant |
| | I love you | 0.5 | Irrelevant |
| | Movie | 0.4 | Irrelevant |
| | Good morning | 0.3 | Relevant |
| | I don't know | 0.2 | Irrelevant |
| I love you | I love you | 0.6 | Relevant |
| | Let's go | 0.5 | Irrelevant |
| | Movie | 0.4 | Irrelevant |
| | Good morning | 0.3 | Irrelevant |
| | I don't know | 0.2 | Irrelevant |

Referring secondly to the assessment of stickers (end-to-end type assessments), in such cases, the relevant recommendation ranking metric is referred to as a relevant sticker ranking metric, or RSR metric. When using the RSR metric, the evaluation engine 234 firstly obtains the tags and relevance scores for each query, as shown with respect to two example queries in Table 3 below. Then, the evaluation engine 234 converts, for each query, the relevance scores into a probability distribution by applying a normalized exponential function. The "softmax" function was used for this purpose to yield the probability scores shown in Table 3. The probability score in Table 3 is indicative of a likelihood of recommendation of the relevant tag based on the output of the pre-trained machine learning model.

TABLE 3

Examples of data used to apply a RSR metric

| Query | Prediction (e.g., "smart reply tag") | Relevance score (generated by model) | Probability score (softmax) |
|---|---|---|---|
| Hi | Laugh | 0.6 | 0.24 |
| | I love you | 0.5 | 0.22 |
| | Movie | 0.4 | 0.20 |
| | Hey | 0.3 | 0.18 |
| | Sun | 0.2 | 0.16 |
| I love you | I love you | 0.6 | 0.24 |
| | Laugh | 0.5 | 0.22 |
| | Movie | 0.4 | 0.20 |
| | Hey | 0.3 | 0.18 |
| | Sun | 0.2 | 0.16 |

For purposes of the RSR metric, the evaluation engine 234 also obtains, for each tag, the stickers returned by the sticker search engine and relevance scores generated by the sticker search engine for each sticker. As mentioned, each tag may be provided as input to a processor-implemented sticker search engine, and the sticker search engine may return stickers matching the tag, along with a relevance score for each. Table 4 below illustrates such relevance scores for each prediction shown in Table 3. As an example, seven stickers are included for each prediction (tag) of the sticker recommendation model.

TABLE 4

Examples of further data used to apply a RSR metric

| Prediction (e.g., "smart reply tag") | Sticker 1 | Sticker 2 | Sticker 3 | Sticker 4 | Sticker 5 | Sticker 6 | Sticker 7 |
|---|---|---|---|---|---|---|---|
| Laugh | 0.7 | 0.5 | 0.6 | 0.3 | 0.3 | 0.4 | 0.9 |
| I love you | 1 | 0.4 | 0.5 | 0.5 | 0.2 | 0.15 | 0.32 |
| Movie | 0.4 | 0.9 | 0.9 | 0.3 | 0.4 | 0.2 | 0.5 |
| Hey | 0.5 | 0.3 | 0.3 | 0.9 | 0.5 | 0.7 | 0.5 |
| Sun | 0.7 | 0.5 | 0.3 | 0.4 | 0.2 | 0.9 | 0.6 |

The evaluation engine 234 then identifies one sticker as being relevant to each of the original queries, as shown in Table 5 below, while others are classified as irrelevant to that particular query. Stickers may be classified by user input or automatic techniques, e.g., a machine learning model of the artificial intelligence and machine learning system 230 as described above.

TABLE 5

Examples of further data used to apply a RSR metric

| Query | Sticker | Classification |
|---|---|---|
| Hi | Sticker 1 | Irrelevant |
| | Sticker 2 | Irrelevant |
| | Sticker 3 | Irrelevant |
| | Sticker 4 | Relevant |
| | Sticker 5 | Irrelevant |
| | Sticker 6 | Irrelevant |
| | Sticker 7 | Irrelevant |
| I love you | Sticker 1 | Relevant |
| | Sticker 2 | Irrelevant |
| | Sticker 3 | Irrelevant |
| | Sticker 4 | Irrelevant |
| | Sticker 5 | Irrelevant |
| | Sticker 6 | Irrelevant |
| | Sticker 7 | Irrelevant |

The evaluation engine 234 further converts the relevance scores generated by the sticker search engine, as shown in Table 4, to probability scores using the softmax function. These probability scores are shown in Table 6 below.

TABLE 6

Examples of further data used to apply a RSR metric

| Prediction (e.g., "smart reply tag") | Sticker 1 | Sticker 2 | Sticker 3 | Sticker 4 | Sticker 5 | Sticker 6 | Sticker 7 |
|---|---|---|---|---|---|---|---|
| Laugh | 0.16 | 0.13 | 0.15 | 0.11 | 0.11 | 0.12 | 0.20 |
| I love you | 0.24 | 0.13 | 0.15 | 0.15 | 0.11 | 0.10 | 0.12 |
| Movie | 0.12 | 0.20 | 0.20 | 0.11 | 0.12 | 0.10 | 0.13 |
| Hey | 0.13 | 0.11 | 0.11 | 0.20 | 0.14 | 0.17 | 0.14 |
| Sun | 0.17 | 0.14 | 0.11 | 0.12 | 0.10 | 0.20 | 0.15 |

Then, in order to generate a total score, referred to as a combined probability score, for each sticker for a particular query, the evaluation engine 234 applies a formula similar to a total probability formula. The formula is illustrated below with reference to the total score for Sticker 4 as it relates to the Query "Hi." In the formula below, "CPS" refers to Combined Probability Score, $P_{SRM}$ refers to "Probability Score based on Sticker Recommendation Model" and $P_{SSE}$ refers to "Probability Score based on Sticker Search Engine." The CPS is indicative of a likelihood of recommendation of the relevant sticker for a given query, based on the output of the pre-trained machine learning model and the sticker search engine.

$$CPS(Hi,Sticker4)=P_{SRM}(Hi,Laugh)*P_{SSE}(Laugh, Sticker4)+P_{SRM}(Hi,I\ love\ you)*P_{SSE}(I\ love\ you, Sticker4)+P_{SRM}(Hi,Movie)*P_{SSE}(Movie, Sticker4)+P_{SRM}(Hi,Hey)*P_{SSE}(Hey,Sticker4)+ P_{SPM}(Hi,Sun)*P_{SSE}(Sun,Sticker4)$$

$$CPS(Hi,Sticker4)=0.24*0.11+0.22*0.15+0.20*0.11+ 0.18*0.20+0.16*0.12CPS(Hi,Sticker4)=0.1366$$

The CPS value is calculated in this manner for each of the seven stickers, and the stickers are ranked, for each query, according to their CPS value. This ranking is shown in Table 7 below.

TABLE 7

| Examples of further data used to apply a RSR metric | | |
|---|---|---|
| Query | Stickers (Ranked) | CPS |
| Hi | Sticker 1 | 0.1658 |
| | Sticker 7 | 0.1496 |
| | Sticker 3 | 0.1464 |
| | Sticker 2 | 0.142 |
| | Sticker 4 | 0.1366 |
| | Sticker 6 | 0.1334 |
| | Sticker 5 | 0.1158 |
| I love you | Sticker 1 | 0.1674 |
| | Sticker 7 | 0.148 |
| | Sticker 3 | 0.1464 |
| | Sticker 2 | 0.1420 |
| | Sticker 4 | 0.1374 |
| | Sticker 6 | 0.133 |
| | Sticker 5 | 0.1158 |

The evaluation engine 234 then determines the ranking, or position, of the relevant sticker recommendation within the plurality of sticker recommendations. In Table 7, for the query "Hi," the ranking is "5," as the most relevant tag has the fourth highest relevance score, while for the query "I love you," the ranking is "1," as the most relevant tag has the highest relevance score. The model quality score may then be determined by the evaluation engine 234 by aggregating the rankings, e.g., by calculating an average ranking across all queries in the set of text queries. A lower model quality score, according to the RSR metric, indicates better recommendations.

Relevant Recommendation Probability Metric

The relevant recommendation probability metric is a fourth non-limiting example of a quality metric, which may be applied alone or in combination with other metrics. The relevant recommendation probability metric may be implemented as a type of end-to-end metric, or as a metric that assesses tags only.

Referring firstly to the assessment of tags only, in such cases, the relevant recommendation probability metric may be referred to as a relevant text probability metric, or RTP metric. The RTP metric considers, for each query, probability scores of the tags generated by applying a normalized exponential function to the relevance scores generated for the tags by the sticker recommendation model. The evaluation engine 234 identifies one of the tags as relevant and classifies the other tags as irrelevant. The probability score of the tag that is identified as relevant is then selected for each query, and the average of all selected probability scores is the model quality score for RTP.

As an example, the data of Table 2 is presented again below in Table 8, together with the probability scores generated using the softmax function. For the two example queries shown in Table 8, the selected probability score for "Good morning" is 0.18 and the selected probability score for "I love you" is 0.24, yielding a model quality score of 0.21 (average of 0.18 and 0.24).

TABLE 8

| Examples of data used to apply a RTP metric | | | | |
|---|---|---|---|---|
| Query | Prediction (e.g., "smart reply tag") | Relevance score (generated by model) | Probability score | Classification |
| Good morning | Let's go | 0.6 | 0.24 | Irrelevant |
| | I love you | 0.5 | 0.22 | Irrelevant |

TABLE 8-continued

| Examples of data used to apply a RTP metric | | | | |
|---|---|---|---|---|
| Query | Prediction (e.g., "smart reply tag") | Relevance score (generated by model) | Probability score | Classification |
| | Movie | 0.4 | 0.20 | Irrelevant |
| | Good morning | 0.3 | 0.18 | Relevant |
| | I don't know | 0.2 | 0.16 | Irrelevant |
| I love you | I love you | 0.6 | 0.24 | Relevant |
| | Let's go | 0.5 | 0.22 | Irrelevant |
| | Movie | 0.4 | 0.20 | Irrelevant |
| | Good morning | 0.3 | 0.18 | Irrelevant |
| | I don't know | 0.2 | 0.16 | Irrelevant |

Referring secondly to the assessment of stickers (end-to-end type assessment), in such cases, the relevant recommendation probability metric may be referred to as a relevant sticker probability metric, or RSP metric. When using the RSP metric, the steps as described with reference to the RSR metric may be followed to arrive at the CPS for each sticker. The CPS for each of the stickers selected as the relevant sticker for a particular query can then be averaged to arrive at the model quality score for RSP.

For example, considering the data in Table 7 once more, to calculate the model quality score for the RSP metric, the selected probability score for "Hi" (0.1366) is taken and the selected probability score for "I love you" (0.1674) is taken and the two scores are averaged, yielding a model quality score of 0.1520.

Coverage Metric

The coverage metric is a fifth non-limiting example of a quality metric, which may be used alone or in combination with other quality metrics. The coverage metric is applied by the evaluation engine 234 to determine the percentage of requests (queries) for which the sticker recommendation model returns a candidate item, e.g., a result in the form of a text tag. Where the sticker recommendation model returns a candidate item, this may be referred to as a non-empty sticker recommendation, while an empty recommendation refers to a case where the sticker recommendation model is unable to predict any candidate item.

The evaluation engine 234 may automatically determine coverage using the formula below, where n is the size of the set of queries (e.g., number of queries in the validation set), m is the number of different outputs (e.g., text tags) generated by the model, and "$R_1$ to $R_m$" refers to the number of times each output appears in the results, ordered by frequency from the most frequent to the least frequent ($R_1$ thus being the largest and $R_m$ being the smallest).

$$\text{Coverage} = \frac{\sum_{i=1}^{m} R_i}{n}$$

Table 9 below provides a simplified example. In the case of Table 9, the model quality score according to the coverage metric is 0.82, which can be broken down as: (3+2+1+1+1+1+1)/11.

US 12,579,204 B1

29

TABLE 9

| Examples of data used to apply a coverage metric | |
|---|---|
| Query | Prediction (e.g., text tag) |
| Hi | Hi |
| Good Morning | Hi |
| Let's Watch | Movie |
| Love you | I love you |
| Love | I love you |
| Hey | Hi |
| Let's go | Let's go |
| It's sunny today | Sun |
| We are going to a restaurant | Dinner |
| AAA | (No prediction/Empty) |
| Quantum physics | (No prediction/Empty) |

Diversity Metric

The diversity metric is a sixth non-limiting example of a quality metric, which may be used alone or in combination with other quality metrics. The diversity metric is applied by the evaluation engine 234 to determine the percentage or proportion of the sticker recommendations that is covered by a predefined number of most common sticker recommendations generated by the model. In other words, it answers the question: what portion of the answers/outputs is covered by the Top "X" (e.g., Top 1, Top 5, or Top 10) most common answers/outputs generated by the model? Example formulas for Top 1, Top 5, and Top 10 calculations, respectively, are included below, using the same notation as used with respect to the coverage metric above.

$$DiversityTop1 = \frac{R_1}{\sum_{i=1}^{m} R_i}$$

$$DiversityTop5 = \frac{\sum_{i=1}^{5} R_i}{\sum_{i=1}^{m} R_i}$$

$$DiversityTop10 = \frac{\sum_{i=1}^{10} R_i}{\sum_{i=1}^{m} R_i}$$

Figure 9:
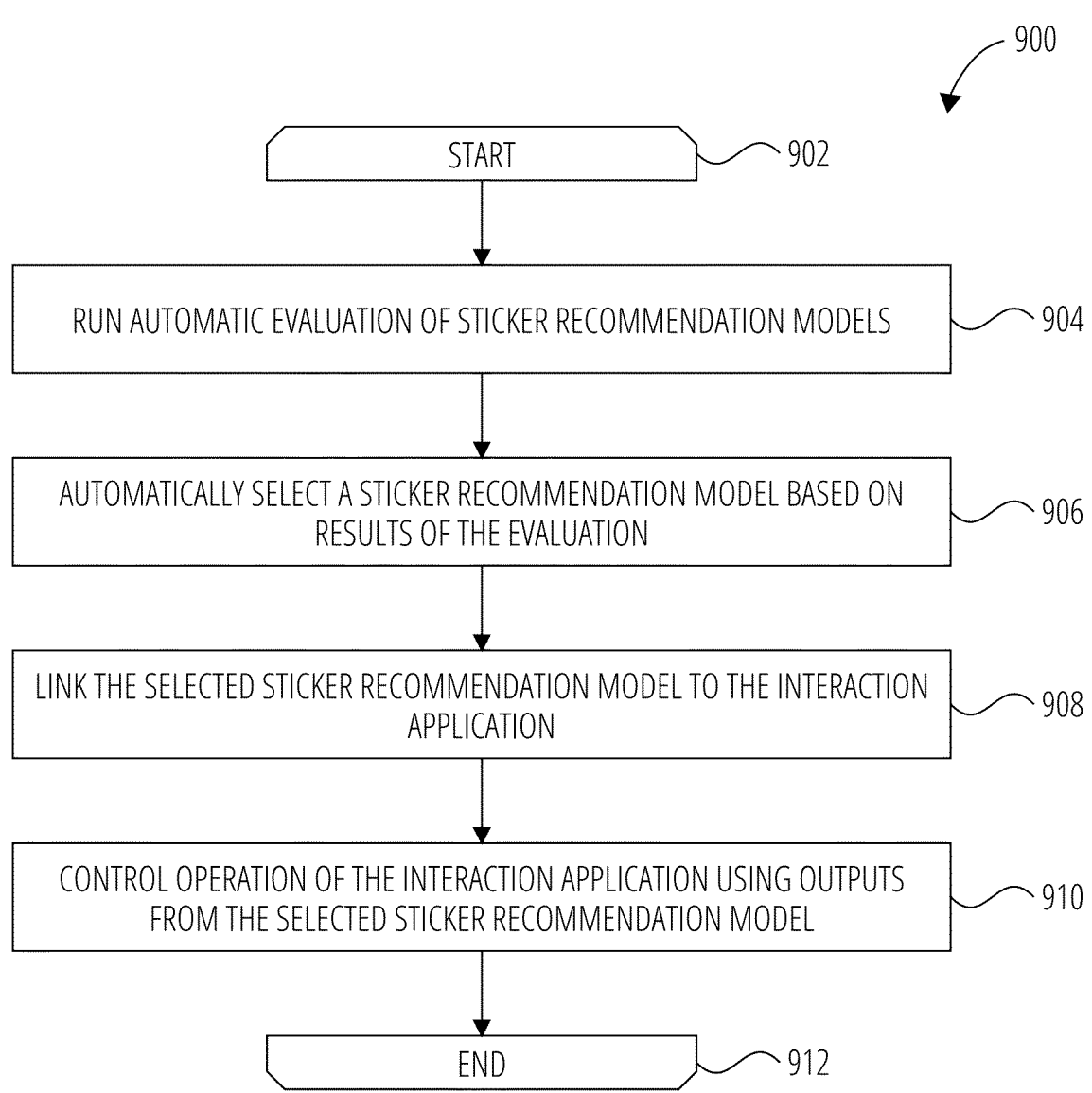
FIG. 9 is a flowchart illustrating a method suitable for controlling operation of an interaction application using a selected graphical element recommendation model, such as a selected sticker recommendation model, according to some examples.

FIG. 9 is a flowchart illustrating a method 900 suitable for controlling operation of an interaction application using a selected graphical element recommendation model, such as a selected sticker recommendation model, according to some examples. The method 900 is performed, in some examples, by various subsystems of the interaction system 100, e.g., the artificial intelligence and machine learning system 230 and/or the sticker system 232. Accordingly, such subsystems are referenced below.

The method 900 commences at opening loop element 902 and proceeds to operation 904, where the interaction system 100 performs automatic evaluation of multiple sticker recommendation models. For example, one or more of the techniques described above (e.g., with reference to FIG. 7) can be employed by the evaluation engine 234 to generate a model quality score for each of the sticker recommendation models, based on a particular model quality metric (or using multiple metrics).

At operation 906, the interaction system 100 processes the results (e.g., the model quality scores) and automatically selects one of the sticker recommendation models. For example, the sticker system 232 automatically selects the best-performing model in terms of a preferred metric. The method 900 proceeds to operation 908, where the sticker system 232 and/or the artificial intelligence and machine learning system 230 links the selected sticker recommendation model to the interaction application. For instance, the sticker system 232 associates the selected sticker recommendation model with the interaction application for all or a subset of users of the interaction system 100, enabling the interaction application to communicate with and/or receive outputs from the selected sticker recommendation model.

In some examples, the selected sticker recommendation model is run locally at the user systems 102, and can thus be provided to the relevant user systems 102. In other examples, the interaction clients 104 communicate with the sticker system 232 and/or the artificial intelligence and machine learning system 230 to run the selected sticker recommendation model.

At operation 910, the interaction system 100 causes operation of the interaction application to be controlled using the selected sticker recommendation model. For example, when a user of the interaction client 104 adds text to an input field of a messaging interface, or based on a context or content of a conversation with another user, the interaction client 104 causes presentation of sticker recommendations within the message interface using output from the selected sticker recommendation model. In this way, examples in the present disclosure allow for dynamic selection and use of optimal or near-optimal recommendation models. The method 900 concludes at closing loop element 912.

Examples described herein provide an automated system that not only assesses the performance of various sticker recommendation models using quality metrics but also dynamically selects and implements one of the models based on these assessments. This can enhance efficiency, adaptability, and system performance. For example, the operational efficiency of a computer system is improved, reducing the latency and resource expenditure associated with updates and adjustments.

Data Communications Architecture

Figure 10:
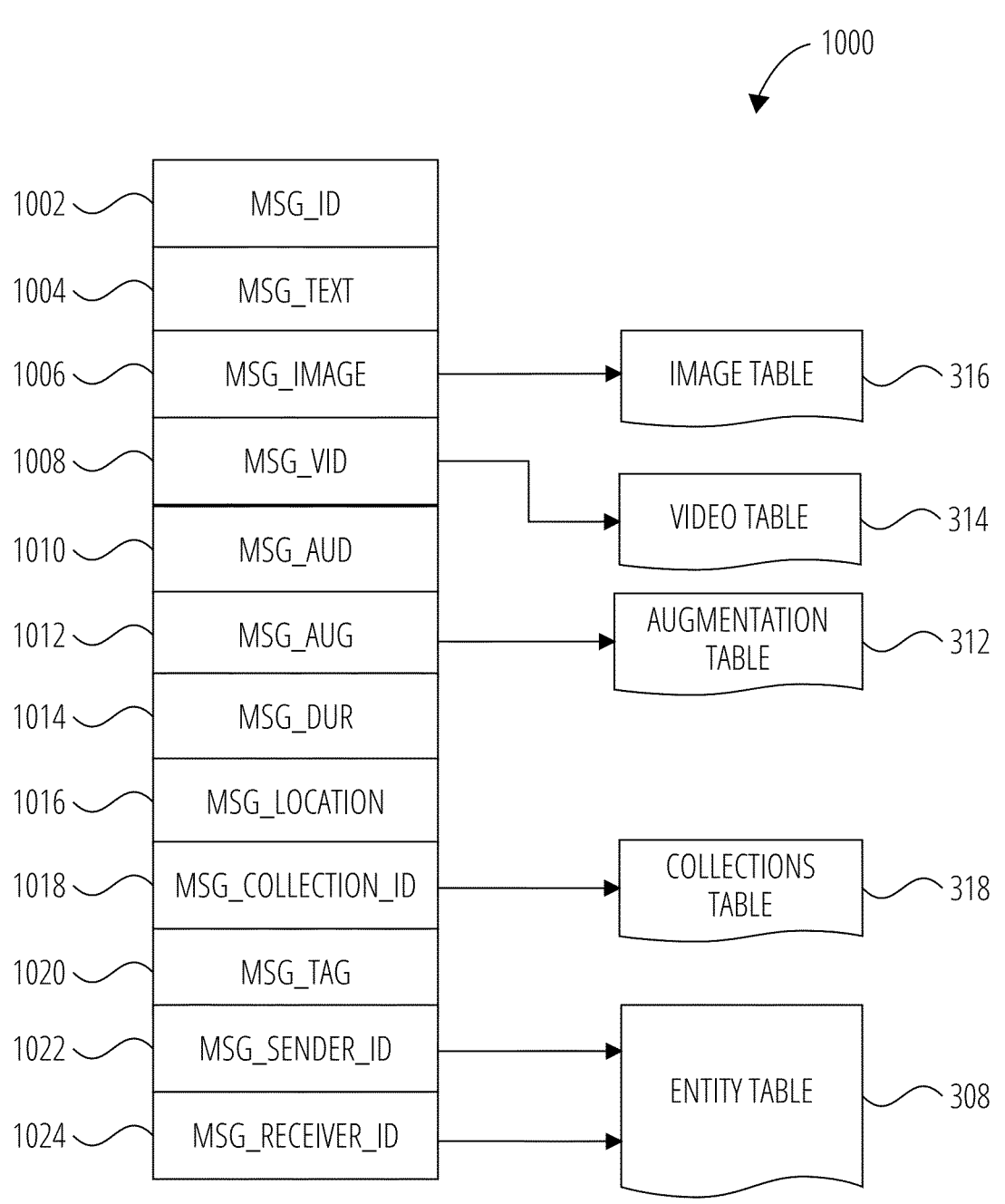
FIG. 10 is a diagrammatic representation of a message, according to some examples.

FIG. 10 is a schematic diagram illustrating a structure of a message 1000, according to some examples, generated by an interaction client 104 for communication to a further interaction client 104 via the interaction servers 124. The content of a particular message 1000 is used to populate the message table 306 stored within the database 304, accessible by the interaction servers 124. Similarly, the content of a message 1000 is stored in memory as "in-transit" or "in-flight" data of the user system 102 or the interaction servers 124. A message 1000 is shown to include the following example components:

Message identifier 1002: a unique identifier that identifies the message 1000.

Message text payload 1004: text, to be generated by a user via a user interface of the user system 102, and that is included in the message 1000.

Message image payload 1006: image data, captured by a camera component of a user system 102 or retrieved from a memory component of a user system 102, and that is included in the message 1000. Image data for a sent or received message 1000 may be stored in the image table 316. Image data may include stickers from the sticker table 320.

Message video payload 1008: video data, captured by a camera component or retrieved from a memory component of the user system 102, and that is included in the message 1000. Video data for a sent or received message 1000 may be stored in the video table 314.

Message audio payload 1010: audio data, captured by a microphone or retrieved from a memory component of the user system 102, and that is included in the message 1000.

Message augmentation data 1012: augmentation data (e.g., filters, stickers, or other annotations or enhancements) that represents augmentations to be applied to message image payload 1006, message video payload 1008, or message audio payload 1010 of the message 1000. Augmentation data for a sent or received message 1000 may be stored in the augmentation table 312.

Message duration parameter 1014: parameter value indicating, in seconds, the amount of time for which content of the message (e.g., the message image payload 1006, message video payload 1008, message audio payload 1010) is to be presented or made accessible to a user via the interaction client 104.

Message geolocation parameter 1016: geolocation data (e.g., latitudinal and longitudinal coordinates) associated with the content payload of the message. Multiple message geolocation parameter 1016 values may be included in the payload, each of these parameter values being associated with respect to content items included in the content (e.g., a specific image within the message image payload 1006, or a specific video in the message video payload 1008).

Message collection identifier 1018: identifier values identifying one or more content collections (e.g., "stories" identified in the collections table 318) with which a particular content item in the message image payload 1006 of the message 1000 is associated. For example, multiple images within the message image payload 1006 may each be associated with multiple content collections using identifier values.

Message tag 1020: each message 1000 may be tagged with multiple tags, each of which is indicative of the subject matter of content included in the message payload. For example, where a particular image included in the message image payload 1006 depicts an animal (e.g., a lion), a tag value may be included within the message tag 1020 that is indicative of the relevant animal. Tag values may be generated manually, based on user input, or may be automatically generated using, for example, image recognition.

Message sender identifier 1022: an identifier (e.g., a messaging system identifier, email address, or device identifier) indicative of a user of the user system 102 on which the message 1000 was generated and from which the message 1000 was sent.

Message receiver identifier 1024: an identifier (e.g., a messaging system identifier, email address, or device identifier) indicative of a user of the user system 102 to which the message 1000 is addressed.

The contents (e.g., values) of the various components of message 1000 may be pointers to locations in tables within which content data values are stored. For example, an image value in the message image payload 1006 may be a pointer to (or address of) a location within an image table 316. Similarly, values within the message video payload 1008 may point to data stored within a video table 314, values stored within the message augmentation data 1012 may point to data stored in an augmentation table 312, values stored within the message collection identifier 1018 may point to data stored in a collections table 318, and values stored within the message sender identifier 1022 and the message receiver identifier 1024 may point to user records stored within an entity table 308.

System with Head-Wearable Apparatus

Figure 11:
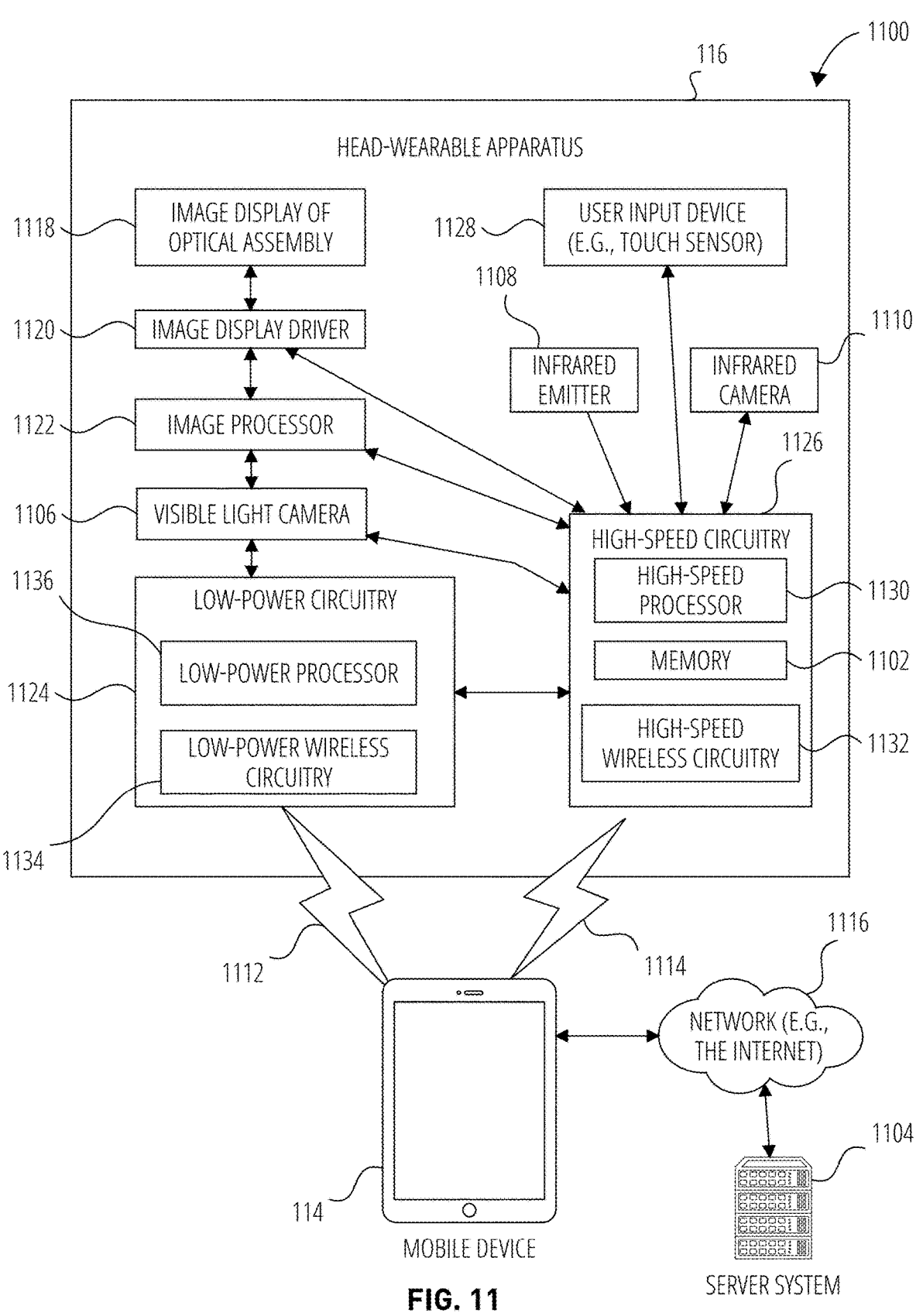
FIG. 11 illustrates a system including a head-wearable apparatus, according to some examples.

FIG. 11 illustrates a system 1100 including a head-wearable apparatus 116, according to some examples. FIG. 11 is a high-level functional block diagram of an example head-wearable apparatus 116 communicatively coupled to a mobile device 114 and various server systems 1104 (e.g., the interaction server system 110) via various networks, such as the network 1116.

The head-wearable apparatus 116 includes one or more cameras, each of which may be, for example, a visible light camera 1106, an infrared emitter 1108, and/or an infrared camera 1110.

The mobile device 114 connects with head-wearable apparatus 116 using both a low-power wireless connection 1112 and a high-speed wireless connection 1114. The mobile device 114 is also connected to the server system 1104 and the network 1116.

The head-wearable apparatus 116 further includes two image displays of the image display of optical assembly 1118. The two image displays of optical assembly 1118 include one associated with the left lateral side and one associated with the right lateral side of the head-wearable apparatus 116. The head-wearable apparatus 116 also includes an image display driver 1120, an image processor 1122, low-power circuitry 1124, and high-speed circuitry 1126. The image display of optical assembly 1118 is for presenting images and videos, including an image that can include a graphical user interface to a user of the head-wearable apparatus 116.

The image display driver 1120 commands and controls the image display of optical assembly 1118. The image display driver 1120 may deliver image data directly to the image display of optical assembly 1118 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1128 (e.g., touch sensor or push button), including an input surface on the head-wearable apparatus 116. The user input device 1128 (e.g., touch sensor or push button) is to receive from the user an input selection to manipulate the graphical user interface of the presented image.

The components shown in FIG. 11 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1106 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1102, which stores instructions to perform a subset or all of the functions described herein. The memory 1102 can also include a storage device.

As shown in FIG. 11, the high-speed circuitry 1126 includes a high-speed processor 1130, a memory 1102, and high-speed wireless circuitry 1132. In some examples, the image display driver 1120 is coupled to the high-speed circuitry 1126 and operated by the high-speed processor 1130 in order to drive the left and right image displays of the image display of optical assembly 1118. The high-speed processor 1130 may be any processor capable of managing high-speed communications and operation of any general computing system needed for the head-wearable apparatus 116. The high-speed processor 1130 includes processing resources needed for managing high-speed data transfers on a high-speed wireless connection 1114 to a wireless local area network (WLAN) using the high-speed wireless circuitry 1132. In certain examples, the high-speed processor 1130 executes an operating system such as a LINUX operating system or other such operating system of the head-wearable apparatus 116, and the operating system is stored in the memory 1102 for execution. In addition to any other responsibilities, the high-speed processor 1130 executing a software architecture for the head-wearable apparatus 116 is used to manage data transfers with high-speed wireless circuitry 1132. In certain examples, the high-speed wireless circuitry 1132 is configured to implement Institute of Electrical and Electronic Engineers (IEEE) 802.11 communication standards, also referred to herein as Wi-Fi®. In some examples, other high-speed communications standards may be implemented by the high-speed wireless circuitry 1132.

The low-power wireless circuitry 1134 and the high-speed wireless circuitry 1132 of the head-wearable apparatus 116 can include short-range transceivers (Bluetooth™) and wireless wide, local, or wide area network transceivers (e.g., cellular or Wi-Fi®). Mobile device 114, including the transceivers communicating via the low-power wireless connection 1112 and the high-speed wireless connection 1114, may be implemented using details of the architecture of the head-wearable apparatus 116, as can other elements of the network 1116.

The memory 1102 includes any storage device capable of storing various data and applications, including, among other things, camera data generated by the left and right visible light cameras 1106, the infrared camera 1110, and the image processor 1122, as well as images generated for display by the image display driver 1120 on the image displays of the image display of optical assembly 1118. While the memory 1102 is shown as integrated with high-speed circuitry 1126, in some examples, the memory 1102 may be an independent standalone element of the head-wearable apparatus 116. In certain such examples, electrical routing lines may provide a connection through a chip that includes the high-speed processor 1130 from the image processor 1122 or the low-power processor 1136 to the memory 1102. In some examples, the high-speed processor 1130 may manage addressing of the memory 1102 such that the low-power processor 1136 will boot the high-speed processor 1130 any time that a read or write operation involving memory 1102 is needed.

As shown in FIG. 11, the low-power processor 1136 or high-speed processor 1130 of the head-wearable apparatus 116 can be coupled to the camera (visible light camera 1106, infrared emitter 1108, or infrared camera 1110), the image display driver 1120, the user input device 1128 (e.g., touch sensor or push button), and the memory 1102.

The head-wearable apparatus 116 is connected to a host computer. For example, the head-wearable apparatus 116 is paired with the mobile device 114 via the high-speed wireless connection 1114 or connected to the server system 1104 via the network 1116. The server system 1104 may be one or more computing devices as part of a service or network computing system, for example, that includes a processor, a memory, and network communication interface to communicate over the network 1116 with the mobile device 114 and the head-wearable apparatus 116.

The mobile device 114 includes a processor and a network communication interface coupled to the processor. The network communication interface allows for communication over the network 1116, low-power wireless connection 1112, or high-speed wireless connection 1114. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1120. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1104, such as the user input device 1128, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitational sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1112 and high-speed wireless connection 1114 from the mobile device 114 via the low-power wireless circuitry 1134 or high-speed wireless circuitry 1132.

Figure 12:
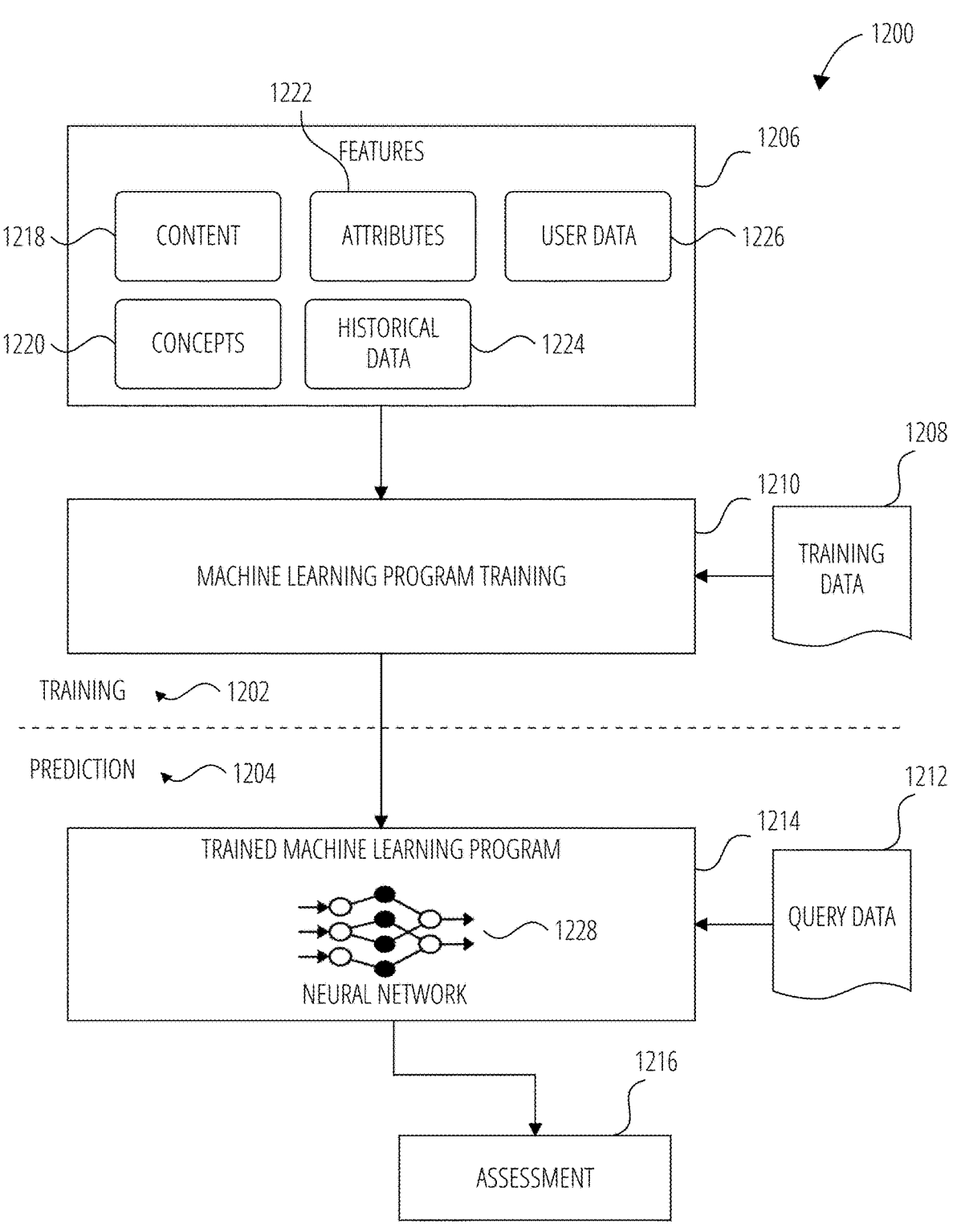
FIG. 12 is a diagram illustrating training and use of a machine learning program, according to some examples.

FIG. 12 is a block diagram generally illustrating a machine learning program 1200, according to some examples. Machine learning programs, also referred to as machine learning algorithms or tools, may be used as part of the techniques and systems described herein.

Machine learning explores the study and construction of algorithms, also referred to herein as tools, that may learn from or be trained using existing data and make predictions about or based on new data. Such machine learning tools operate by building a model from training data 1208 in order to make data-driven predictions or decisions expressed as outputs or assessments (e.g., assessment 1216). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used. Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 1200 supports two types of phases, namely training phases 1202 and prediction phases 1204. In training phases 1202, supervised learning, unsupervised or reinforcement learning may be used. For example, the machine learning program 1200 (1) receives features 1206 (e.g., as structured or labeled data in supervised learning) and/or (2) identifies features 1206 (e.g., unstructured or unlabeled data for unsupervised learning) in training data 1208. In prediction phases 1204, the machine learning program 1200 uses the features 1206 for analyzing query data 1212 to generate outcomes or predictions, as examples of an assessment 1216 (this phase is also referred to as inference).

In a training phase 1202, feature engineering may be used to identify features 1206 and may include identifying informative, discriminating, and independent features for the effective operation of the machine learning program 1200 in pattern recognition, classification, and regression. In some examples, the training data 1208 includes labeled data, which is known data for pre-identified features 1206 and one or more outcomes. Each of the features 1206 may be a variable or attribute, such as individual measurable property of a process, article, system, or phenomenon represented by a data set (e.g., the training data 1208). Features 1206 may also be of different types, such as numeric features, strings, and graphs, and may include one or more of content 1218, concepts 1220, attributes 1222, historical data 1224 and/or user data 1226, merely for example.

The concept of a feature in this context is related to that of an explanatory variable used in statistical techniques such as linear regression. Choosing informative, discriminating, and independent features is important for the effective operation of the machine learning program 1200 in pattern recognition, classification, and regression. Features may be of different types, such as numeric features, strings, and graphs.

In training phases 1202, the machine learning program 1200 uses the training data 1208 to find correlations among the features 1206 that affect a predicted outcome or assessment 1216. With the training data 1208 and the identified features 1206, the machine learning program 1200 is trained during the training phase 1202 at machine learning program training 1210. The machine learning program 1200 appraises values of the features 1206 as they correlate to the training data 1208. The result of the training is the trained machine learning program 1214 (e.g., a trained or learned model).

Further, the training phases 1202 may involve machine learning, in which the training data 1208 is structured (e.g., labeled during preprocessing operations), and the trained machine learning program 1214 implements a relatively simple neural network 1228 capable of performing, for example, classification and clustering operations. In other examples, the training phase 1202 may involve deep learning, in which the training data 1208 is unstructured, and the trained machine learning program 1214 implements a deep neural network 1228 that is able to perform both feature extraction and classification/clustering operations.

A neural network 1228 generated during the training phase 1202, and implemented within the trained machine learning program 1214, may include a hierarchical (e.g., layered) organization of neurons. For example, neurons (or nodes) may be arranged hierarchically into a number of layers, including an input layer, an output layer, and multiple hidden layers. Each of the layers within the neural network 1228 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 1228 may also be one of a number of different types of neural networks, including a single-layer feed-forward network, an Artificial Neural Network (ANN), a Recurrent Neural Network (RNN), a transformer network, a symmetrically connected neural network, an unsupervised pre-trained network, a Convolutional Neural Network (CNN), or a Recursive Neural Network (RNN), merely for example.

During prediction phases 1204, or inference, the trained machine learning program 1214 is used to perform an assessment. Query data 1212 (or input features) is provided as an input to the trained machine learning program 1214, and the trained machine learning program 1214 generates the assessment 1216 as output, responsive to receipt of the query data 1212.

As mentioned, in examples of the present disclosure, a supervised machine learning algorithm may be used to train a machine learning model in the form of a sticker recommendation model. The sticker recommendation model may be trained to receive, as input features, attributes or characteristics of a received message, and generate as output, candidate items and/or relevance scores for use in selecting recommended stickers, according to some examples. Consistent with some examples, a supervised machine learning algorithm may be used to train a machine learning model to generate as output, a relevance score for each sticker, or for each category or tag. During a training stage, a machine learning algorithm or training system may be provided with example, annotated, or labeled data (e.g., training data), with the objective of learning a function that will map the example inputs to the example outputs. In this instance, the training data are historical data that have been observed over some prior time period. Specifically, the historical data comprises a mapping of various message features, sender features, and recipient features, for a specific message, to a tag or sticker ID, associated with a sticker that was sent in reply to the specific message. For instance, the text included in a caption of a message may be used as a message feature in training the machine learning model.

By way of example, by using the text included with a message, the sticker recommendation model may be trained to identify a relationship between certain words (e.g., "birthday") and specific stickers, or specific categories/tags of stickers. With some examples, in addition to message features, each individual instance of training data may also include sender features and/or recipient features. Here, sender features are attributes and characteristics of the sender of the message, while recipient features are attributes and characteristics of a message recipient. These features may include information from the respective profiles of each end-user (e.g., sender or recipient), including information concerning the age or birthdate of the end-user, current or typical location of the end-user, and such.

In some examples, during or after training, the sticker recommendation model may be evaluated and adjusted to improve its performance. For example, a loss function can be used to evaluate the performance of the sticker recommendation model in generating the desired outputs, based on the provided inputs. The weights of the individual neurons of a neural network model may, for example, be manipulated to minimize or reduce the error or difference, as measured by a loss function. Once fully trained and deployed in a production setting, the sticker recommendation model is provided with message features, and optionally sender/recipient features, associated with a specific message sent by a sender to a recipient (or with a query to be used to evaluate the model). The features are then provided as input to the machine learning model, which generates a relevance score for each category/tag or for each sticker.

Machine Architecture

Figure 13:
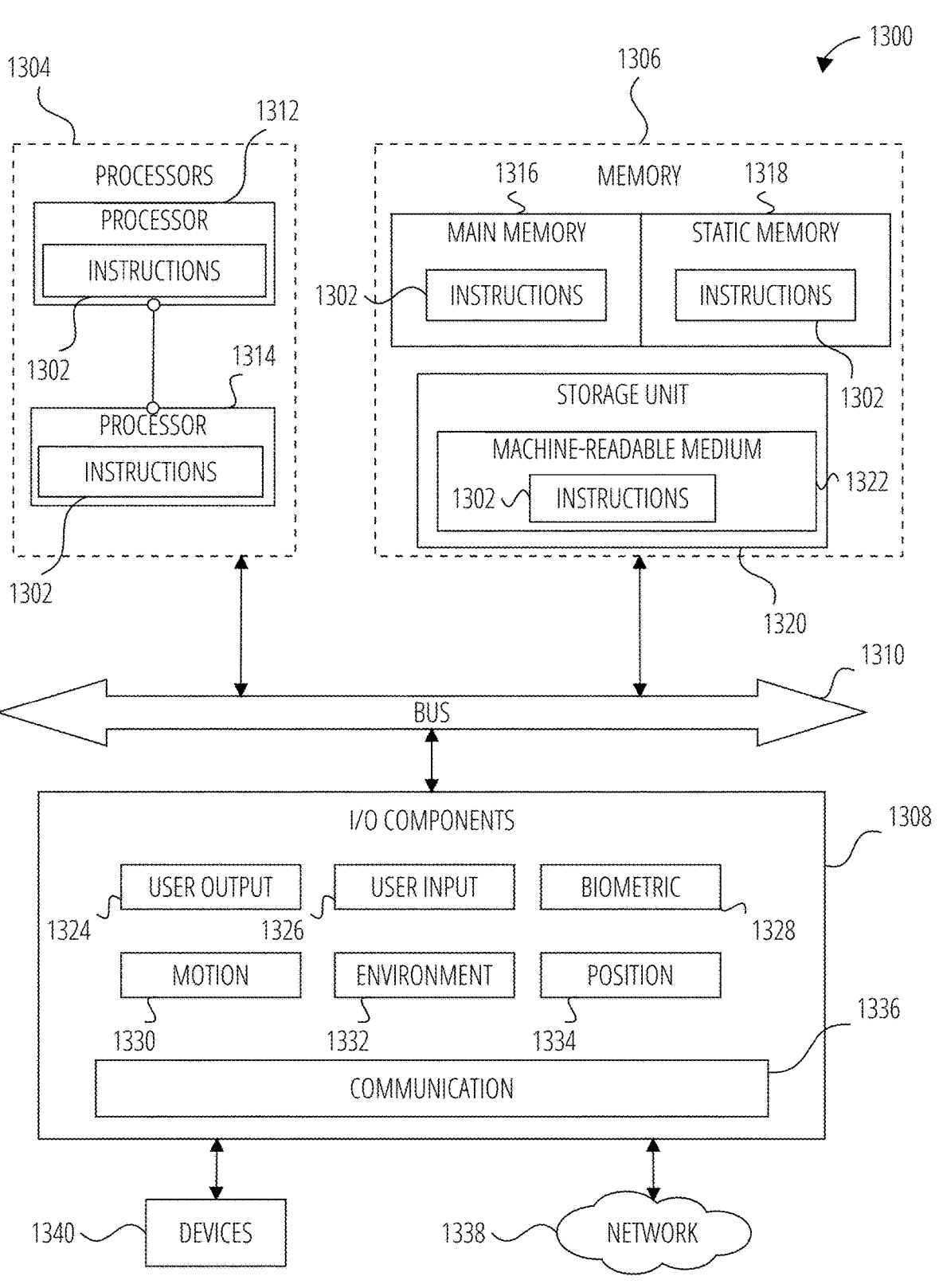
FIG. 13 is a diagrammatic representation of a machine in the form of a computer system within which a set of instructions may be executed to cause the machine to perform any one or more of the methodologies discussed herein, according to some examples.

FIG. 13 is a diagrammatic representation of the machine 1300 within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies discussed herein. The machine 1300, for example, may comprise the user system 102 or any one of multiple server devices forming part of the interaction server system 110. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1308, which may be configured to communicate with each other via a bus 1310. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that execute the instructions 1302. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. Any biometric data collected by the biometric components is captured and stored with only user approval and deleted on user request. Further, such biometric data may be used for very limited purposes, such as identification verification. To ensure limited and authorized use of biometric information and other PII, access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components 1330 include acceleration sensor components (e.g., accelerometer), gravitation sensor components, rotation sensor components (e.g., gyroscope).

The environmental components 1332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth™ components (e.g., Bluetooth™ Low Energy), Wi-Fi components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

Figure 14:
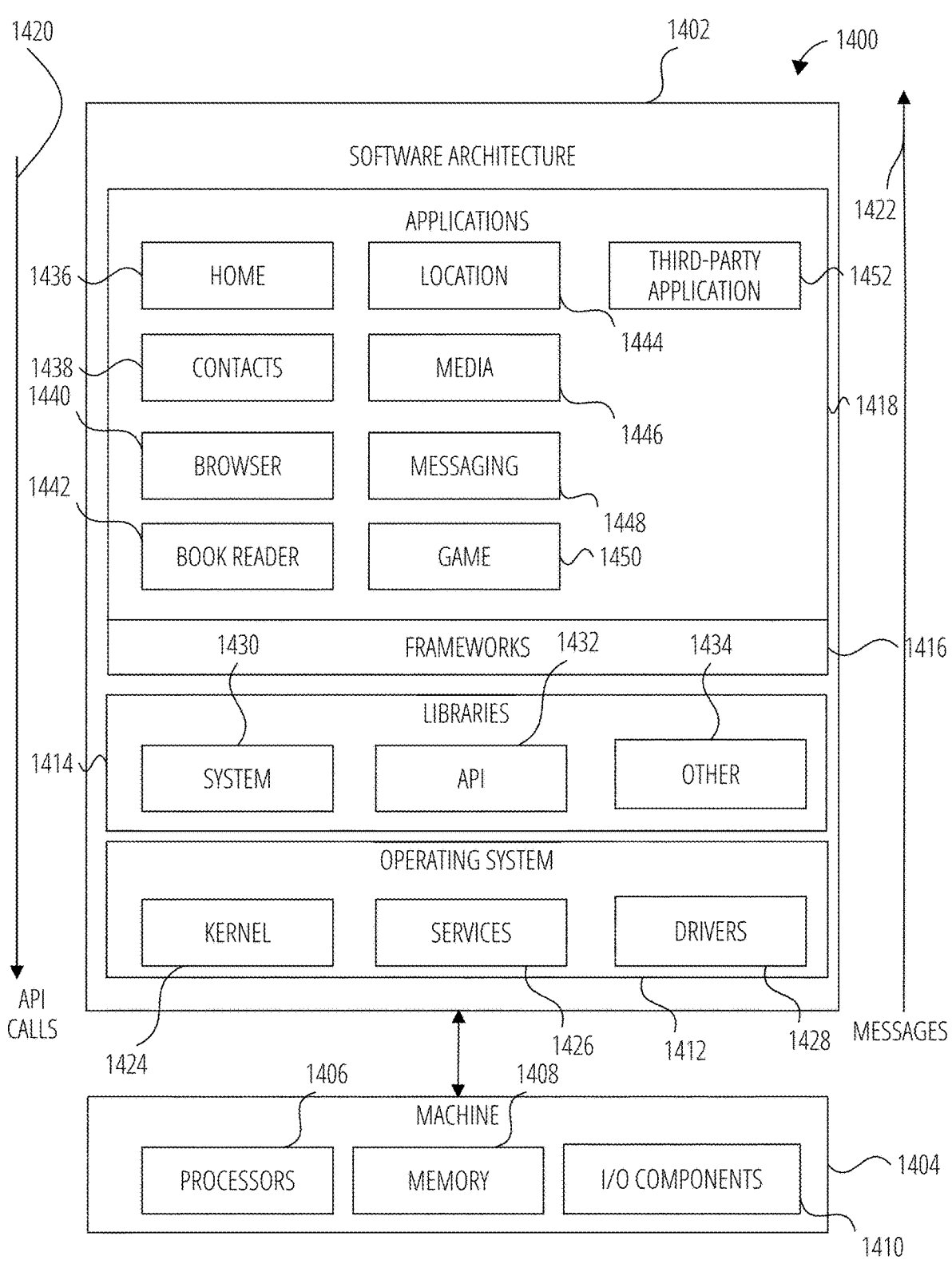
FIG. 14 is a block diagram showing a software architecture within which examples may be implemented.

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture 1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, Bluetooth™ or Bluetooth™ Low Energy drivers, flash memory drivers, serial communication drivers (e.g., USB drivers), WI-FI drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematic functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts application 1438, a browser application 1440, a book reader application 1442, a location application 1444, a media application 1446, a messaging application 1448, a game application 1450, and a broad assortment of other applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

CONCLUSION

While examples in the present disclosure focus primarily on machine learning models used to generate sticker recommendations, it should be appreciated that techniques described herein may also be applied to evaluate other types of systems or engines used to generate sticker recommendations, e.g., a rules-based engine that matches text in a message to tags or other metadata associated with specific stickers.

As used in this disclosure, the term "machine learning model" (or simply "model") may refer to a single, stand-alone model, or a combination of models. The term may also refer to a system, component or module that includes a machine learning model together with one or more supporting or supplementary components that do not necessarily perform machine learning tasks.

It is noted that while the example interfaces in FIGS. 4-6 are described and shown as being presented on a touch screen, such as a screen of the mobile device 114, interfaces according to some examples may also be presented using other types of devices that can provide suitable user interfaces or displays, e.g., the optical display of a head-wearable apparatus 116, a desktop computer, or via smart contact lenses. Examples of the present disclosure are thus not restricted to user interfaces that require touch-based gestures.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout this disclosure, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device," refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multiprocessor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium"

and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"Sticker" refers, for example, to a type of digital content that may be used to convey emotions, reactions, moods, statements, views, or messages, within a message. While some stickers may be in the form of emojis, stickers are often larger and/or more expressive than regular emojis, and they may feature characters, illustrations, or animations. Stickers can be sent as standalone messages, or they can be added to a message to enhance its meaning or add a playful or creative element to the conversation. Some applications allow users to download and use custom sticker packs, while others offer a selection of built-in stickers. Some applications allow users to create their own custom or personal stickers.

"User device" refers, for example, to a device accessed, controlled, or owned by a user and with which the user interacts to perform an action, or interaction on the user device, including an interaction with other users or computer systems.

EXAMPLES

In view of the above-described implementations of subject matter this application, discloses the following list of examples, wherein one feature of an example in isolation, or more than one feature of an example taken in combination, and, optionally, in combination with one or more features of one or more further examples, are further examples also falling within the disclosure of this application.

Example 1 is a system comprising: at least one processor; and at least one memory storing instructions that, when executed by the at least one processor, cause the at least one processor to perform operations comprising: accessing a set of text queries; processing each text query in the set of text queries via a graphical element recommendation machine learning model to obtain, for each text query, one or more graphical element recommendations, the graphical element recommendation machine learning model being trained to generate, based on a given text query, one or more graphical element recommendations for use in a message in a context of a messaging interface of an interaction application; accessing a selection of a model quality metric; generating a model quality score for the graphical element recommendation machine learning model by applying the model quality metric to the graphical element recommendations obtained for the set of text queries; and causing presentation, at a user device, of output indicative of the model quality score.

In Example 2, the subject matter of Example 1 includes, wherein the graphical element recommendation machine learning model comprises a sticker recommendation model, and each of the one or more graphical element recommendations obtained for each text query comprises a sticker recommendation.

In Example 3, the subject matter of any of Examples 1-2 includes, wherein the set of text queries is selected from a message data set that comprises historic message data associated with users of an interaction system that provides the interaction application.

In Example 4, the subject matter of any of Examples 1-3 includes, wherein the historic message data comprises historic sticker search queries submitted by the users using the interaction application provided by the interaction system.

In Example 5, the subject matter of any of Examples 1-4 includes, wherein the historic message data comprises messages exchanged between users via the interaction system.

In Example 6, the subject matter of any of Examples 1-5 includes, wherein the historic message data comprises captions in messages shared by users using the interaction application provided by the interaction system.

In Example 7, the subject matter of any of Examples 1-6 includes, the operations further comprising: automatically selecting the set of text queries from the message data set based on frequency of each text query within the message data set.

In Example 8, the subject matter of any of Examples 1-7 includes, wherein the graphical element recommendation machine learning model is trained to generate, based on a given text query, one or more graphical element recommendations for use in a reply to a message containing the given text query in the context of the messaging interface, wherein the one or more graphical element recommendations generated based on the given text query comprise a plurality of relevance scores for use in selecting stickers to recommend in the reply, and wherein training data used in training the graphical element recommendation machine learning model comprises historical message data related to stickers that were previously selected in response to previously received messages.

In Example 9, the subject matter of any of Examples 1-8 includes, wherein, for each text query, the one or more graphical element recommendations comprises a plurality of candidate items and a relevance score for each candidate item.

In Example 10, the subject matter of any of Examples 1-9 includes, wherein each of the plurality of candidate items comprises at least one of a sticker or a text tag, the text tag being selected from a plurality of supported text tags of the graphical element recommendation machine learning model.

In Example 11, the subject matter of any of Examples 1-10 includes, wherein generating the model quality score for the graphical element recommendation machine learning model comprises applying the model quality metric to one or more of the relevance scores for each of the one or more graphical element recommendations.

In Example 12, the subject matter of any of Examples 1-11 includes, wherein, prior to applying the model quality metric to the one or more relevance scores, the relevance scores for each of the one or more graphical element recommendations are converted into a probability distribution (e.g., by applying a normalized exponential function).

In Example 13, the subject matter of any of Examples 1-12 includes, wherein each of the plurality of candidate items comprises a text tag, and generating the model quality score for the graphical element recommendation machine learning model comprises: identifying at least one sticker corresponding to each text tag (e.g., by providing the text tag as input to a processor-implemented sticker search engine); generating a probability score for each sticker, the probability score being indicative of a likelihood of recommendation of the sticker based on output of the graphical element recommendation machine learning model; and applying the model quality metric to the probability scores generated for the stickers.

In Example 14, the subject matter of any of Examples 1-13 includes, wherein the model quality metric comprises at least one of: a relevant recommendation ranking metric, a relevant recommendation probability metric, a coverage metric, a diversity metric, an end-to-end relevance metric, or a text relevance metric.

In Example 15, the subject matter of any of Examples 1-14 includes, wherein the model quality metric is a relevant recommendation ranking metric, a plurality of graphical element recommendations is generated for each text query, and generating the model quality score for the graphical element recommendation machine learning model comprises, for each text query: identifying one of the plurality of graphical element recommendations as a relevant recommendation; and determining a ranking of the relevant recommendation within the plurality of graphical element recommendations (e.g., the model quality score is generated by aggregating or averaging the rankings determined for the relevant recommendations of the respective text queries).

In Example 16, the subject matter of any of Examples 1-15 includes, wherein the model quality metric is a relevant recommendation probability metric, wherein a plurality of graphical element recommendations is generated for each text query, and wherein generating the model quality score for the graphical element recommendation machine learning model comprises, for each text query: identifying one of the plurality of graphical element recommendations as a relevant recommendation; and determining a probability score of the relevant recommendation with respect to the plurality of graphical element recommendations, the probability score being indicative of a likelihood of recommendation of the relevant recommendation based on output of the graphical element recommendation machine learning model (e.g., the model quality score is generated by aggregating or averaging the probability scores determined for the relevant recommendations of the respective text queries).

In Example 17, the subject matter of any of Examples 1-16 includes, wherein the model quality metric is a coverage metric, the model quality score being indicative of a percentage or proportion of the set of text queries for which the graphical element recommendation machine learning model returns non-empty graphical element recommendations.

In Example 18, the subject matter of any of Examples 1-17 includes, wherein the model quality score is a diversity metric, the model quality score being indicative of a percentage or proportion of the graphical element recommendations covered by a predefined number of most common graphical element recommendations generated by the graphical element recommendation machine learning model.

In Example 19, the subject matter of any of Examples 1-18 includes, the operations further comprising: linking the graphical element recommendation machine learning model to the interaction application; and controlling operation of the interaction application by using outputs from the graphical element recommendation machine learning model to provide further graphical element recommendations for new messages generated by one or more users of the interaction application.

In Example 20, the subject matter of any of Examples 1-19 includes, wherein the graphical element recommendation machine learning model is a first graphical element recommendation machine learning model, the one or more graphical element recommendations obtained for each text query in the set of text queries are one or more first graphical element recommendations, and the model quality score is a first model quality score, the operations further comprising: processing each text query in the set of text queries via a second graphical element recommendation machine learning model to obtain, for each text query, one or more second graphical element recommendations; generating a second model quality score for the second graphical element recommendation machine learning model by applying the model quality metric to the second graphical element recommendations; comparing the first model quality score and the second model quality score to obtain a comparison result; and automatically selecting one of the first graphical element recommendation machine learning model and the second graphical element recommendation machine learning model based on the comparison result to obtain a selected graphical element recommendation machine learning model.

In Example 21, the subject matter of any of Examples 1-20 includes, the operations further comprising: linking the selected graphical element recommendation machine learning model to the interaction application; and controlling operation of the interaction application by using outputs from the selected graphical element recommendation machine learning model to provide further graphical element recommendations for new messages generated by one or more users of the interaction application.

In Example 22, the subject matter of Example 21 includes, the operations further comprising: receiving, from the user device, an instruction to link the selected graphical element recommendation machine learning model to the interaction application.

In Example 23, the subject matter of any of Examples 1-22 includes, wherein the model quality score is generated by a processor-implemented evaluation engine.

In Example 24, the subject matter of any of Examples 1-23 includes, the operations further comprising: receiving, from the user device, a selection of the model quality metric.

In Example 25, the subject matter of any of Examples 1-23 includes, the operations further comprising: causing presentation of a plurality of options at the user device, each option corresponding to a respective model quality metric; and receiving, from the user device, a selection of the model quality metric via a selection of one of the plurality of options.

Example 26 is a method comprising: accessing a set of text queries; processing each text query in the set of text queries via a graphical element recommendation machine learning model to obtain, for each text query, one or more graphical element recommendations, the graphical element recommendation machine learning model being trained to generate, based on a given text query, one or more graphical element recommendations for use in a message in a context of a messaging interface of an interaction application; accessing a selection of a model quality metric; generating a model quality score for the graphical element recommendation machine learning model by applying the model quality metric to the graphical element recommendations obtained for the set of text queries; and causing presentation, at a user device, of output indicative of the model quality score.

Example 27 is a non-transitory computer-readable storage medium storing instructions that, when executed by at least one processor, cause the at least one processor to perform operations comprising: accessing a set of text queries; processing each text query in the set of text queries via a graphical element recommendation machine learning model to obtain, for each text query, one or more graphical element recommendations, the graphical element recommendation machine learning model being trained to generate, based on a given text query, one or more graphical element recommendations for use in a message in a context of a messaging interface of an interaction application; accessing a selection of a model quality metric; generating a model quality score for the graphical element recommendation machine learning model by applying the model quality metric to the graphical element recommendations obtained for the set of text queries; and causing presentation, at a user device, of output indicative of the model quality score.

Example 28 is at least one machine-readable medium including instructions that, when executed by processing circuitry, cause the processing circuitry to perform operations to implement any of Examples 1-27.

Example 29 is an apparatus comprising means to implement any of Examples 1-27.

Example 30 is a system to implement any of Examples 1-27.

Example 31 is a method to implement any of Examples 1-27.

What is claimed is:

1. A system comprising:

at least one processor; and at least one memory storing instructions that, when executed by the at least one processor, cause the at least one processor to perform operations comprising:

accessing a set of text queries;

processing each text query in the set of text queries via a graphical element recommendation machine learning model to obtain, for each text query, one or more graphical element recommendations, the graphical element recommendation machine learning model being trained to generate, based on a given text query, one or more graphical element recommendations for use in a message in a context of a messaging interface of an interaction application;

US 12,579,204 B1

51 accessing a selection of a model quality metric;
generating a model quality score for the graphical element recommendation machine learning model by applying the model quality metric to the graphical element recommendations obtained for the set of text queries; and
causing presentation, at a user device, of output indicative of the model quality score.

2. The system of claim 1, the operations further comprising:
linking the graphical element recommendation machine learning model to the interaction application; and
controlling operation of the interaction application by using outputs from the graphical element recommendation machine learning model to provide further graphical element recommendations for new messages generated by one or more users of the interaction application.

3. The system of claim 1, wherein the graphical element recommendation machine learning model comprises a sticker recommendation model, and each of the one or more graphical element recommendations obtained for each text query comprises a sticker recommendation.

4. The system of claim 1, wherein the set of text queries is selected from a message data set that comprises historic message data associated with users of an interaction system that provides the interaction application.

5. The system of claim 4, wherein the historic message data comprises historic sticker search queries submitted by the users using the interaction application provided by the interaction system.

6. The system of claim 4, the operations further comprising:
automatically selecting the set of text queries from the message data set based on frequency of each text query within the message data set.

7. The system of claim 1, the operations further comprising:
training the graphical element recommendation machine learning model to generate, based on a given text query, one or more graphical element recommendations for use in a reply to a message containing the given text query in the context of the messaging interface, the one or more graphical element recommendations generated based on the given text query comprising a plurality of relevance scores for use in selecting stickers to recommend in the reply, and training data used in training the graphical element recommendation machine learning model comprising historical message data related to stickers that were previously selected in response to previously received messages.

8. The system of claim 1, wherein, for each text query, the one or more graphical element recommendations comprises a plurality of candidate items and a relevance score for each candidate item.

9. The system of claim 8, wherein each of the plurality of candidate items comprises at least one of a sticker or a text tag, the text tag being selected from a plurality of supported text tags of the graphical element recommendation machine learning model.

10. The system of claim 8, wherein generating the model quality score for the graphical element recommendation machine learning model comprises applying the model quality metric to one or more of the relevance scores for each of the one or more graphical element recommendations.

11. The system of claim 8, wherein each of the plurality of candidate items comprises a text tag, and generating the model quality score for the graphical element recommendation machine learning model comprises:
identifying at least one sticker corresponding to each text tag;
generating a probability score for each sticker, the probability score being indicative of a likelihood of recommendation of the sticker based on output of the graphical element recommendation machine learning model; and
applying the model quality metric to the probability scores generated for the stickers.

12. The system of claim 1, wherein the model quality metric comprises at least one of: a relevant recommendation ranking metric, a relevant recommendation probability metric, a coverage metric, a diversity metric, an end-to-end relevance metric, or a text relevance metric.

13. The system of claim 1, wherein the model quality metric is a relevant recommendation ranking metric, a plurality of graphical element recommendations is generated for each text query, and generating the model quality score for the graphical element recommendation machine learning model comprises, for each text query:
identifying one of the plurality of graphical element recommendations as a relevant recommendation; and
determining a ranking of the relevant recommendation within the plurality of graphical element recommendations.

14. The system of claim 1, wherein the model quality metric is a relevant recommendation probability metric, wherein a plurality of graphical element recommendations is generated for each text query, and wherein generating the model quality score for the graphical element recommendation machine learning model comprises, for each text query:
identifying one of the plurality of graphical element recommendations as a relevant recommendation; and
determining a probability score of the relevant recommendation with respect to the plurality of graphical element recommendations, the probability score being indicative of a likelihood of recommendation of the relevant recommendation based on output of the graphical element recommendation machine learning model.

15. The system of claim 1, wherein the model quality metric is a coverage metric, the model quality score being indicative of a percentage or proportion of the set of text queries for which the graphical element recommendation machine learning model returns non-empty graphical element recommendations.

16. The system of claim 1, wherein the model quality score is a diversity metric, the model quality score being indicative of a percentage or proportion of the graphical element recommendations covered by a predefined number of most common graphical element recommendations generated by the graphical element recommendation machine learning model.

17. The system of claim 1, wherein the graphical element recommendation machine learning model is a first graphical element recommendation machine learning model, the one or more graphical element recommendations obtained for each text query in the set of text queries are one or more first graphical element recommendations, and the model quality score is a first model quality score, the operations further comprising:

processing each text query in the set of text queries via a second graphical element recommendation machine learning model to obtain, for each text query, one or more second graphical element recommendations;

generating a second model quality score for the second graphical element recommendation machine learning model by applying the model quality metric to the second graphical element recommendations;

comparing the first model quality score and the second model quality score to obtain a comparison result; and automatically selecting one of the first graphical element recommendation machine learning model and the second graphical element recommendation machine learning model based on the comparison result to obtain a selected graphical element recommendation machine learning model.

18. The system of claim 17, the operations further comprising:

linking the selected graphical element recommendation machine learning model to the interaction application; and controlling operation of the interaction application by using outputs from the selected graphical element recommendation machine learning model to provide further graphical element recommendations for new messages generated by one or more users of the interaction application.

19. A method comprising:

accessing a set of text queries;

processing each text query in the set of text queries via a graphical element recommendation machine learning model to obtain, for each text query, one or more graphical element recommendations, the graphical element recommendation machine learning model being trained to generate, based on a given text query, one or more graphical element recommendations for use in a message in a context of a messaging interface of an interaction application;

accessing a selection of a model quality metric;

generating a model quality score for the graphical element recommendation machine learning model by applying the model quality metric to the graphical element recommendations obtained for the set of text queries; and causing presentation, at a user device, of output indicative of the model quality score.

20. A non-transitory computer-readable storage medium storing instructions that, when executed by at least one processor, cause the at least one processor to perform operations comprising:

accessing a set of text queries;

processing each text query in the set of text queries via a graphical element recommendation machine learning model to obtain, for each text query, one or more graphical element recommendations, the graphical element recommendation machine learning model being trained to generate, based on a given text query, one or more graphical element recommendations for use in a message in a context of a messaging interface of an interaction application;

accessing a selection of a model quality metric;

generating a model quality score for the graphical element recommendation machine learning model by applying the model quality metric to the graphical element recommendations obtained for the set of text queries; and causing presentation, at a user device, of output indicative of the model quality score.

\* \* \* \* \*